US012067682B2

(12) United States Patent
Atlas et al.

(10) Patent No.: US 12,067,682 B2
(45) Date of Patent: *Aug. 20, 2024

(54) GENERATING AN EXTENDED-REALITY LOBBY WINDOW FOR COMMUNICATION BETWEEN NETWORKING SYSTEM USERS

(71) Applicant: Meta Platforms Technologies, LLC, Menlo Park, CA (US)

(72) Inventors: Charlene Mary Atlas, Redmond, WA (US); Mark Terrano, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,855

(22) Filed: Sep. 13, 2022

(65) Prior Publication Data

US 2023/0281929 A1 Sep. 7, 2023

Related U.S. Application Data

(63) Continuation of application No. 16/920,119, filed on Jul. 2, 2020, now Pat. No. 11,475,634.

(51) Int. Cl.
*G06T 19/00* (2011.01)
*G06F 3/04815* (2022.01)
(Continued)

(52) U.S. Cl.
CPC .......... *G06T 19/00* (2013.01); *G06F 3/04815* (2013.01); *G06F 3/0482* (2013.01);
(Continued)

(58) Field of Classification Search
None
See application file for complete search history.

(56) References Cited

U.S. PATENT DOCUMENTS 6,559,863 B1 5/2003 Megiddo
8,537,196 B2 9/2013 Hegde et al.
(Continued)

FOREIGN PATENT DOCUMENTS

CA 3039347 A1 4/2018
WO 2020117657 A1 6/2020

OTHER PUBLICATIONS

Baxter D.B., "Creating Treemap Chart Using JavaScript," AnyChart News, Aug. 1, 2019, 12 Pages.
(Continued)

*Primary Examiner* — Yi Wang
(74) *Attorney, Agent, or Firm* — Potomac Law Group, PLLC; Dannon G. Allbee

(57) ABSTRACT

The present disclosure relates to systems, methods, and non-transitory computer-readable media that initiate communication between users of a networking system within an extended reality environment. For example, the disclosed systems can generate an extended-reality lobby window graphical user interface element for display on an extended-reality device of a user. The disclosed systems can further determine a connection between the user and a co-user and provide an animated visual representation of the co-user for display within the extended-reality lobby window graphical user interface element. In response to receiving user input targeting the animated visual representation of the co-user, the disclosed systems can generate and send, for display on an extended-reality device of the co-user, an invitation to join an extended-reality communication session with the user.

20 Claims, 15 Drawing Sheets

(51) Int. Cl.
*G06F 3/0482* (2013.01)
*G06F 3/16* (2006.01)
*G06T 13/40* (2011.01)
*H04L 51/10* (2022.01)

(52) U.S. Cl.
CPC .............. *G06F 3/167* (2013.01); *G06T 13/40* (2013.01); *H04L 51/10* (2013.01); *G06T 2200/24* (2013.01)

(56) References Cited

U.S. PATENT DOCUMENTS

| | | | |
|---|---|---|---|
| 8,581,958 B2 | 11/2013 | Baker et al. | |
| 8,675,067 B2 | 3/2014 | Chou et al. | |
| 9,338,404 B1 | 5/2016 | Egeler et al. | |
| 9,401,095 B2 | 7/2016 | Kubota et al. | |
| 9,460,340 B2 | 10/2016 | Kauffmann et al. | |
| 9,841,814 B1 | 12/2017 | Kallmeyer et al. | |
| 9,959,676 B2 | 5/2018 | Barzuza et al. | |
| 10,182,210 B1 | 1/2019 | Goetzinger, Jr. | |
| 10,298,587 B2 | 5/2019 | Hook et al. | |
| 10,311,383 B2 | 6/2019 | Holmes et al. | |
| 10,403,050 B1 | 9/2019 | Beall et al. | |
| 10,499,033 B2 | 12/2019 | Pesonen | |
| 10,554,931 B1 | 2/2020 | Zavesky et al. | |
| 10,582,191 B1 | 3/2020 | Marchak, Jr. et al. | |
| 10,664,772 B1 | 5/2020 | Poel et al. | |
| 10,701,318 B2 | 6/2020 | Valli | |
| 10,917,613 B1 | 2/2021 | Chiarella et al. | |
| 10,952,006 B1 | 3/2021 | Krol et al. | |
| 11,140,361 B1 | 10/2021 | Krol et al. | |
| 11,302,085 B2 | 4/2022 | LeBeau et al. | |
| 11,394,925 B1 | 7/2022 | Faulkner et al. | |
| 11,456,887 B1 | 9/2022 | McCracken et al. | |
| 11,528,312 B2 | 12/2022 | Oyman | |
| 11,563,779 B2 | 1/2023 | Copley et al. | |
| 2002/0158873 A1 | 10/2002 | Williamson | |
| 2007/0279484 A1 | 12/2007 | Derocher et al. | |
| 2009/0288007 A1 | 11/2009 | Leacock et al. | |
| 2009/0300516 A1* | 12/2009 | Jerrard-Dunne | G06Q 10/10 715/752 |
| 2010/0085416 A1 | 4/2010 | Hegde et al. | |
| 2011/0107270 A1 | 5/2011 | Wang et al. | |
| 2012/0192088 A1 | 7/2012 | Sauriol et al. | |
| 2012/0204118 A1 | 8/2012 | Lefar et al. | |
| 2012/0246582 A1 | 9/2012 | Leacock et al. | |
| 2012/0317501 A1 | 12/2012 | Milou | |
| 2013/0024785 A1 | 1/2013 | Van Wie | |
| 2013/0031475 A1* | 1/2013 | Maor | A63F 13/533 715/706 |
| 2014/0085316 A1 | 3/2014 | Narayanan | |
| 2014/0085406 A1 | 3/2014 | Narayanan | |
| 2014/0096036 A1 | 4/2014 | Mohler | |
| 2015/0215581 A1 | 7/2015 | Barzuza et al. | |
| 2015/0271220 A1 | 9/2015 | Kleiner et al. | |
| 2015/0279044 A1 | 10/2015 | Kim et al. | |
| 2016/0050394 A1 | 2/2016 | Segal | |
| 2016/0093108 A1 | 3/2016 | Mao et al. | |
| 2016/0132221 A1 | 5/2016 | Lasser et al. | |
| 2016/0155187 A1 | 6/2016 | Paulrajan et al. | |
| 2016/0156584 A1 | 6/2016 | Hum et al. | |
| 2016/0163070 A1 | 6/2016 | Leacock et al. | |
| 2016/0353062 A1 | 12/2016 | Ono et al. | |
| 2017/0257405 A1 | 9/2017 | Lo et al. | |
| 2017/0357917 A1 | 12/2017 | Holmes et al. | |
| 2018/0063480 A1 | 3/2018 | Luks et al. | |
| 2018/0095635 A1 | 4/2018 | Valdivia et al. | |
| 2018/0098059 A1 | 4/2018 | Valdivia et al. | |
| 2018/0101989 A1 | 4/2018 | Frueh et al. | |
| 2018/0139246 A1 | 5/2018 | Rosenberg | |
| 2018/0144212 A1 | 5/2018 | Burgos et al. | |
| 2018/0158246 A1 | 6/2018 | Grau et al. | |
| 2018/0227138 A1 | 8/2018 | Faulkner et al. | |
| 2018/0234671 A1 | 8/2018 | Yang et al. | |
| 2018/0356885 A1 | 12/2018 | Ross et al. | |
| 2019/0042640 A1* | 2/2019 | Valeski | G06F 3/0482 |
| 2019/0045157 A1 | 2/2019 | Venshtain et al. | |
| 2019/0058870 A1 | 2/2019 | Rowell et al. | |
| 2019/0130629 A1 | 5/2019 | Chand et al. | |
| 2019/0171354 A1 | 6/2019 | Dascola et al. | |
| 2019/0253667 A1 | 8/2019 | Valli | |
| 2019/0279424 A1 | 9/2019 | Clausen et al. | |
| 2019/0310757 A1 | 10/2019 | Lee et al. | |
| 2019/0325658 A1 | 10/2019 | Park et al. | |
| 2019/0327392 A1 | 10/2019 | Sarkar | |
| 2019/0340828 A1* | 11/2019 | Harvey | H04N 21/4828 |
| 2019/0346522 A1 | 11/2019 | Botnar et al. | |
| 2019/0371060 A1 | 12/2019 | Energin et al. | |
| 2019/0379750 A1 | 12/2019 | Zamora Duran et al. | |
| 2020/0090350 A1 | 3/2020 | Cho et al. | |
| 2020/0099891 A1 | 3/2020 | Valli et al. | |
| 2020/0118342 A1 | 4/2020 | Varshney et al. | |
| 2020/0128033 A1 | 4/2020 | Kawakita | |
| 2020/0142475 A1 | 5/2020 | Paez et al. | |
| 2020/0154166 A1 | 5/2020 | Rakshit et al. | |
| 2020/0279411 A1 | 9/2020 | Atria et al. | |
| 2020/0296327 A1 | 9/2020 | Karafin et al. | |
| 2020/0329214 A1 | 10/2020 | Ahn et al. | |
| 2020/0371665 A1 | 11/2020 | Clausen et al. | |
| 2020/0396266 A1 | 12/2020 | Goel | |
| 2021/0019541 A1 | 1/2021 | Wang et al. | |
| 2021/0029326 A1 | 1/2021 | Oyman et al. | |
| 2021/0099433 A1 | 4/2021 | Soryal et al. | |
| 2021/0120066 A1 | 4/2021 | Oyman et al. | |
| 2021/0149627 A1 | 5/2021 | Jang et al. | |
| 2021/0248727 A1 | 8/2021 | Fisher et al. | |
| 2021/0263593 A1 | 8/2021 | Lacey | |
| 2021/0281802 A1 | 9/2021 | Kirisken | |
| 2021/0336784 A1 | 10/2021 | Athlur et al. | |
| 2021/0385412 A1 | 12/2021 | Matula et al. | |
| 2021/0390767 A1 | 12/2021 | Johnson et al. | |
| 2021/0392175 A1 | 12/2021 | Gronau et al. | |
| 2021/0392296 A1 | 12/2021 | Rabinovich et al. | |
| 2021/0407520 A1 | 12/2021 | Neckermann et al. | |
| 2022/0084288 A1 | 3/2022 | LeBeau et al. | |
| 2022/0086167 A1 | 3/2022 | Lebeau et al. | |
| 2022/0086205 A1 | 3/2022 | LeBeau et al. | |
| 2022/0103386 A1 | 3/2022 | Jensen | |
| 2022/0109810 A1 | 4/2022 | Kancharlawar et al. | |
| 2022/0116431 A1 | 4/2022 | Mayfield et al. | |
| 2022/0150083 A1 | 5/2022 | Faulkner | |
| 2022/0157342 A1 | 5/2022 | Kliushkin et al. | |
| 2022/0172444 A1 | 6/2022 | LeBeau et al. | |
| 2022/0174108 A1 | 6/2022 | Oyman | |
| 2022/0200979 A1 | 6/2022 | Wenzel | |
| 2022/0229535 A1 | 7/2022 | Evangelista et al. | |
| 2022/0385490 A1 | 12/2022 | Lin et al. | |
| 2022/0417308 A1 | 12/2022 | Oyman | |
| 2023/0082461 A1 | 3/2023 | Gal et al. | |
| 2023/0198745 A1 | 6/2023 | Vansteenkiste et al. | |

OTHER PUBLICATIONS

EBook Reader, "Viewing Popular Highlights on Kindles," [Online], Feb. 15, 2018 [Retrieved on Aug. 5, 2020], 11 Pages, Retrieved from Internet: URL: https://blog.the-ebook-reader.com/2018/02/15/viewing-popular-highlights-on-kindles/.

Garofalakis J., et al., "Personalized Web Search by Constructing Semantic Clusters of User Profiles," Springer Link [Online], 2008 [Retrieved on Aug. 5, 2020], 6 Pages, Retrieved on Internet: URL: https://link.springer.com/chapter/10.1007/978-3-540-85565-1_30.

Gauch S., et al., "Ontology-Based User Profiles for Search and Browsing," [Online], 2002 [Retrieved on Aug. 5, 2020], 6 Pages, Retrieved from Internet: URL: https://www.semanticscholar.org/paper/Ontology-Based-User-Profiles-for-Search-and-Gauch-Chaffee/93af7304757a9beabb10bfbca55b04045bf2ef90.

"Pinterest Communities What are they and How can you Join?," Ivory Mix, Aug. 5, 2020, 19 Pages, Retrieved from Internet: URL: https://ivorymix.com/pinterest-communities/.

Schmeiser L., "Microsoft Analytics Aims to Analyze Worker Habits, Point to More Productivity," [Online], Jul. 5, 2017 [Retrieved on

(56) References Cited

OTHER PUBLICATIONS

Aug. 5, 2020], 3 Pages, Retrieved from Internet: URL: https://www.itprotoday.com/office-365/microsoft-analytics-aims-analyze-worker-habits-point-more-productivity.

Semantic Arts, "White Paper: Semantic Profiling," [Online], Jan. 21, 2015 [Retrieved on Aug. 5, 2020], 11 Pages, Retrieved from Internet: https://www.semanticarts.com/white-paper-semantic-profiling/.

Song X., et al., "A Scalable and Statistically Robust Beam Alignment Technique for mm-Wave Systems," May 8, 2018, 13 pages.

Tarpani G., "What is Google Wave?," Macworld [Online], Feb. 22, 2010 [Retrieved on Aug. 5, 2020], 7 Pages, Retrieved from Internet: URL: https://www.macworld.com/article/1146555/whatisgooglewave.html.

Wanders I., "Build your Own Knowledge Graph: From Unstructured Dark Data to Valuable Business Insights," Vector Consulting [Online], Oct. 18, 2018 [Retrieved on 2020-80-05], 8 Pages, Retrieved from Internet: https://medium.com/vectrconsulting/build-your-own-knowledge-graph-975cf6dde67f.

Wikipedia, The Free Encyclopedia, "Google Wave," [Online], Aug. 5, 2020, 1 Page, Retrieved from Internet: URL: https://simple.wikipedia.org/wiki/Google_Wave.

Wikipedia, The Free Encyclopedia, "Treemapping," Aug. 5, 2020, 13 Pages, Retrieved from Internet: URL: https://en.wikipedia.org/wiki/Treemapping.

Wikipedia: The Free Encyclopedia, "Unconference," Aug. 5, 2020, 3 Pages, Retrieved from Internet: URL: https://en.wikipedia.org/wiki/Unconference.

Gupta K., et al., "Do You See What I See? The Effect ofGaze Tracking on Task Space Remote Collaboration," IEEE Transactions onVisualization and Computer Graphics, Nov. 2016, vol. 22, No. 11, pp. 2413-2422, DOI: 10.1109/TVCG.2016.2593778.

International Search Report and Written Opinion for International Application No. PCT/US2021/038992, mailed Oct. 29, 2021, 16 pages.

International Search Report and Written Opinion for International Application No. PCT/US2023/012192, mailed May 4, 2023, 8 pages.

Jikadra R., et al., "Video Calling with Augmented Reality Using WebRTC API," 2019 6th International Conference on Computing for Sustainable Global Development (INDIACom), Mar. 13, 2019, 5 pages.

Shanmugam M., et al., "Research Opportunities on Virtual Reality and Augmented Reality: A Survey," 2019 IEEE International Conference on System, Computation, Automation and Networking (ICSCAN), Mar. 29, 2019, 6 pages.

Unknown., "A Better Way to Meet Online," Gather, https://www.gather.town/ , Last Accessed Oct. 11, 2021.

* cited by examiner

GENERATING AN EXTENDED-REALITY LOBBY WINDOW FOR COMMUNICATION BETWEEN NETWORKING SYSTEM USERS

CROSS-REFERENCE TO RELATED APPLICATIONS

The present application is a continuation of U.S. application Ser. No. 16/920,119, filed on Jul. 2, 2020. The aforementioned application is hereby incorporated by reference in its entirety.

BACKGROUND

Recent years have seen significant advancement in hardware and software platforms for generating and providing extended reality experiences. Indeed, extended reality (e.g., virtual reality, augmented reality, mixed reality, etc.) has grown in popularity, and technological advancements have facilitated its use in a variety of applications, such as gaming, online shopping, military training, and tourism. In some instances, conventional extended reality systems enable users to communicate with one another in an extended reality environment. For example, these extended-reality communication systems can allow a user to join an extended reality environment as a digital character—often referred to as an avatar—and communicate with co-users via their corresponding avatars.

Despite these advances, however, conventional extended-reality communication systems often suffer from several technological shortcomings that result in inflexible and inefficient operation. For example, conventional extended-reality communication systems are often inflexible in that they limit communication capabilities to instances where the participating avatars are controlled by their corresponding users. Indeed, conventional systems often rely on user input to control the placement and actions of an avatar corresponding to the user within an extended reality environment. Accordingly, such conventional systems often fail to enable communication with a user's avatar independent of the user's control. Further, conventional extended-reality communication systems often rigidly require users, via their avatars, to enter a dedicated extended reality arena that includes the avatars of other users in order to communicate with those users. Such conventional systems often rely on scheduling or some other form of pre-planning in order to facilitate communications between users.

In addition to flexibility concerns, conventional extended-reality communication systems can also operate inefficiently. Indeed, conventional systems can require significant user interaction and time in order to communicate with co-users (e.g., interactions to control a corresponding avatar, interactions to enter an extended reality arena, interactions to locate a targeted co-user and initiate communication, etc.). Accordingly, such conventional systems often require significant amounts of computing resources to process and respond to the user interactions.

These, along with additional problems and issues, exist with regard to conventional extended reality systems.

SUMMARY

One or more embodiments described herein provide benefits and/or solve one or more problems in the art with systems, methods, and non-transitory computer-readable media that utilize an extended-reality lobby window to facilitate flexible communication between users within an extended reality environment. For example, in one or more embodiments, a system generates an extended-reality lobby window into a virtual lobby for display via an extended-reality device of a user. The system can customize the extended reality experience of the user by providing, for display within the virtual lobby, the avatars of co-users that are relevant to the user. The system can identify relevant co-users based on various factors, such as recency of communication with the user, organizational structure, or task similarity. Based on user input received via the extended-reality lobby window, the system can initiate a communication session between the user and one of the co-users within an extended reality environment. In this manner, the system can efficiently simulate a chance encounter between users within the extended reality environment (e.g., similar to a physical encounter between co-workers "bumping" into each other in an office setting) and flexibly facilitate impromptu conversations between those users.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
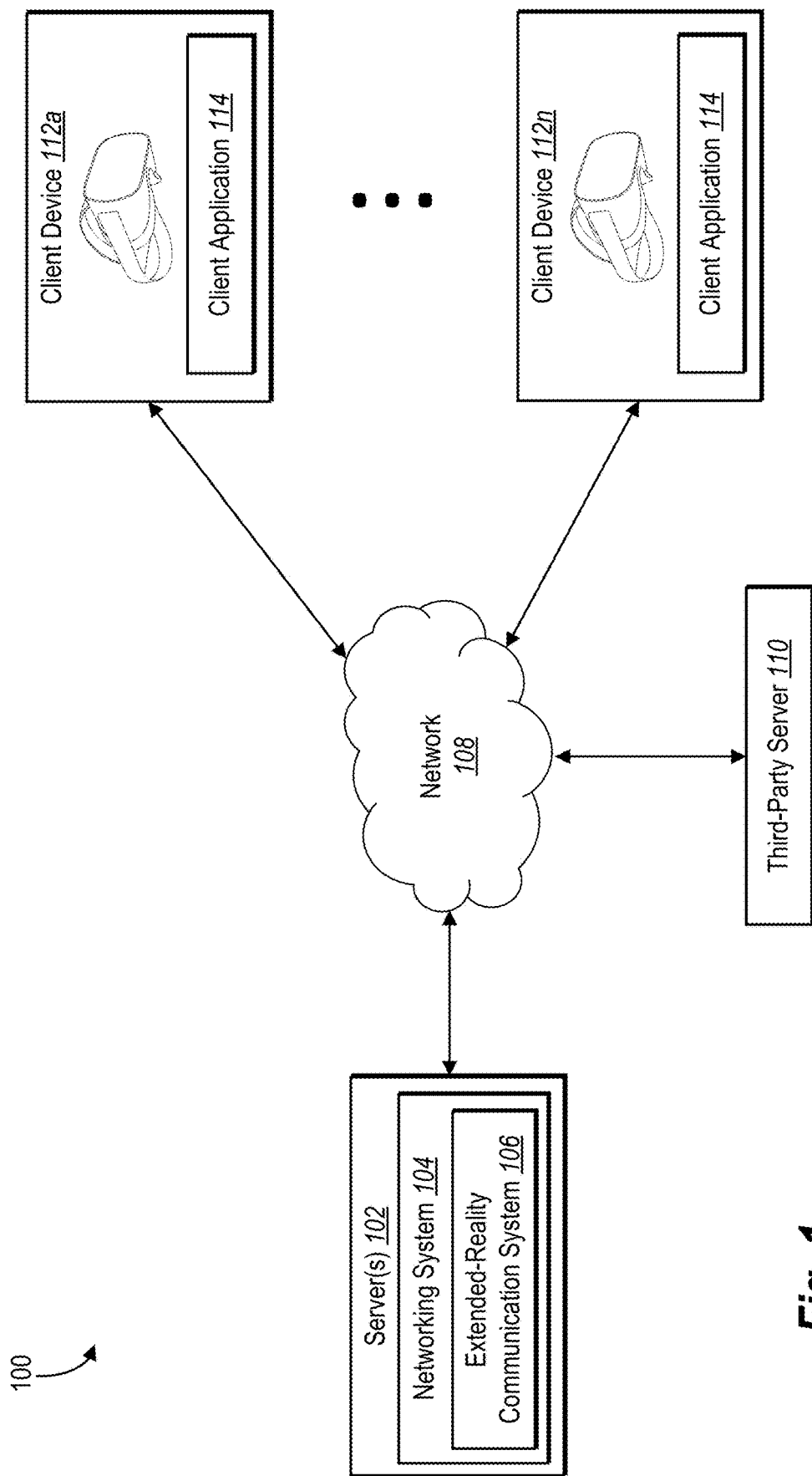
FIG. 1 illustrates an example system environment in which an extended-reality communication system can operate in accordance with one or more embodiments.

One or more embodiments described herein include an extended-reality communication system that generates, for display to a user via an extended-reality device, an extended-reality lobby window that includes avatars corresponding to co-users that are relevant or connected to the user in order to facilitate ad hoc discussions within an extended reality environment. For example, in one or more embodiments, the extended-reality communication system identifies co-users that are connected to a user (e.g., through a similarity in tasks, through a professional relationship, based on recent communications, etc.). The extended-reality communication system can provide avatars corresponding to these co-users for display via the extended-reality lobby window. The extended-reality communication system can further animate the avatars to appear as if they are traversing in front of the extended-reality lobby window. The extended-reality communication system can identify an avatar selected by the user and generate an invitation for the co-user corresponding to the selected avatar to communicate with the user within the extended reality environment.

To provide an illustration, in one or more embodiments, the extended-reality communication system generates, for display on a first extended-reality device corresponding to a user of a networking system, an extended-reality lobby window graphical user interface element (e.g., a virtual window into a virtual lobby). The extended-reality communication system further can determine a connection between the user of the networking system and a co-user of the networking system. Based on the connection between the user and the co-user, the extended-reality communication system can provide an animated visual representation (e.g., an avatar) of the co-user for display within an extended-reality lobby visible via the extended-reality lobby window graphical user interface window. Additionally, the extended-reality communication system can receive user input targeting the animated visual representation of the co-user for communication. In response to receiving the user input, the extended-reality communication system can generate and send an invitation to join an extended-reality communication session to a second extended-reality device corresponding to the co-user.

As mentioned above, in one or more embodiments, the extended-reality communication system determines a connection between a user and a co-user of a networking system. The extended-reality communication system can determine various different types of connections between a user and a co-user. For example, the extended-reality communication system can determine that a user is connected to a co-user with whom the user has recently communicated (e.g., via email, chat, video call, etc.), a co-user that is within a same organization as the user (e.g., a supervisor or co-worker), etc.

In one or more embodiments, the extended-reality communication system determines a connection between the user and a co-user based on the users being associated with similar tasks. For example, the extended-reality communication system can generate a task profile for the user based on one or more digital activities executed by the user (e.g., documents generated or viewed, digital videos watched, searches conducted, etc.). In some embodiments, the extended-reality communication system can generate the task profile further based on digital data corresponding to physical activities of the user (e.g., digital data corresponding to feedback provided by one or more sensors of an extended reality device detecting the physical activities). The extended-reality communication system can determine a connection with a co-user based on a similarity between the task profile of the user and a task profile of the co-user. In some instances, the extended-reality communication system adds the user to a community of co-users based on task profile similarities and determines that the user is connected to the co-users within the community.

As further mentioned above, in one or more embodiments, the extended-reality communication system generates an extended-reality lobby window graphical user interface element for display on an extended-reality device of the user. The extended-reality communication system can provide an animated visual representation of a co-user determined to be connected to the user for display within the extended-reality lobby. In some embodiments, the extended-reality communication system provides a plurality of animated visual representations of co-users for simultaneous display within the extended-reality lobby based on connections between the user and the co-users. In some instances, the extended-reality communication system provides an animated visual representation of a given co-user for display within the extended-reality lobby based on an availability status associated with the co-user. In one or more embodiments, the visual representations walk or pass by the extended-reality lobby window randomly or at predetermined intervals.

In some embodiments, the extended-reality communication system provides additional visual elements for display within the extended-reality lobby window graphical user interface element. For example, the extended-reality communication system can provide visual elements that identify the co-user corresponding to the animated visual representation (e.g., to identify those co-users whom the user may not personally know) or to represent the connection between the user and the co-user (e.g., to represent the strength of the connection or how the user is connected to the co-user).

Additionally, as mentioned above, in one or more embodiments, the extended-reality communication system receives user input targeting an animated visual representation in order to communicate with the corresponding co-user. In some embodiments, the extended-reality communication system utilizes the animated visual representation of the co-user to provide options for communicating with the co-user, including options for speaking with the co-user (e.g., in real time) or sending a message to the co-user. In some instances, the extended-reality communication system provides additional options to the user, such as sending a digital object/document to the co-user.

In response to receiving a selection to speak with the co-user, the extended-reality communication system can generate and send an invitation for the co-user to join an extended-reality communication session with the user. Upon receiving an acceptance of the invitation, the extended-reality communication system can initiate an extended-reality communication session between the user and the co-user. In one or more embodiments, the extended-reality communication system generates a virtual room in which the user and co-user can communicate. In some embodiments, the extended-reality communication system enables the user to communicate with the co-user, via the corresponding animated visual representation, via the extended-reality lobby window graphical user interface element and vice versa.

The extended-reality communication system provides several advantages over conventional systems. For example, the extended-reality communication system can operate more flexibly than conventional systems. To illustrate, the extended-reality communication system flexibly enables a user to interact with an animated visual representation of a co-user without requiring the corresponding co-user to control the animated visual representation. Accordingly, the extended-reality communication system can begin the communication process between users without relying on user control. Further, the extended-reality communication system flexibly enables users to encounter the animated visual representations of co-users outside of a dedicated extended reality arena that is actively sought out by the user. Rather, the extended-reality communication system can utilize the extended-reality lobby window graphical user interface element displayed on the extended-reality device of the user as a passive means for presenting the animated visual representations to the users. Thus, the extended-reality communication system flexibly facilitates impromptu conversations through simulated chance encounters without the need for pre-planning often required by conventional systems.

Further, the extended-reality communication system can operate more efficiently than conventional systems. Indeed, the extended-reality communication system can improve the efficiency of using a computing device by providing user interfaces for initializing communications between users with reduced user interaction. Indeed, by providing animated visual representations of co-users that are determined to have a connection to the user for display within an extended-reality lobby visible via an extended-reality lobby window, the extended-reality communication system can reduce the interactions required by a user in order to communicate with a desired co-user. For example, the extended-reality communication system eliminates the need for user input to locate a co-user with whom the user desires to speak. Thus, the extended-reality communication system can reduce the amount of computing resources used to process such user interactions.

As illustrated by the foregoing discussion, the present disclosure utilizes a variety of terms to describe features and benefits of the extended-reality communication system. Additional detail is now provided regarding the meaning of these terms. For example, as used herein, the term "virtual environment" or "extended-reality environment" refers to a simulated environment in which users can fully or partially immerse themselves. For example, a virtual environment can comprise virtual reality, augmented reality, etc. A virtual environment can include objects and elements with which a user can interact. In general, a user participates in a virtual environment using a client device, such as a dedicated extended-reality device.

As used herein, the term "extended-reality device" refers to a computing device having extended reality capabilities and/or features. In particular, an extended-reality device can refer to a computing device that can display an extended reality graphical user interface. An extended-reality device can further display one or more visual elements within the extended reality graphical user interface and receive user input that targets those visual elements. For example, an extended-reality device can include, but is not limited to, a virtual reality device, an augmented reality device, or a mixed reality device. In particular, an extended-reality device can comprise a head-mounted display, a smartphone, or another computing device.

Additionally, as used herein, the term "extended reality graphical user interface" refers to a graphical user interface having extended reality capabilities and/or features. In particular, an extended reality graphical user interface can refer to a graphical user interface that provides an extended reality environment within which one or more visual elements can be displayed. For example, an extended reality graphical user interface can include, but is not limited to, a user interface associated with a virtual reality environment, an augmented reality environment, or a mixed reality environment.

Further, as used herein, the term "visual element" refers to a graphical display element. In particular, a visual element can refer to a graphical display element displayed within a graphical user interface, such as an extended reality graphical user interface. A visual element can include a static display element or an animated display element. Further, a visual element can include an interactable display element—where a computing device displaying the visual element reacts or is caused to react in response to a user input that targets the visual element. Examples of a visual element include, but are not limited to, a digital image, text, an icon, a symbol, a notification or other graphical indicator, an animated visual representation of a user or a non-user construct, a thumbnail image or other representation of a digital object, a display area, or an extended-reality lobby window graphical user interface element. In one or more embodiments, the extended-reality communication system can display one or more visual elements within another visual display element.

As used herein, the term "extended-reality lobby window graphical user interface element" or "extended-reality lobby window" refers to a visual element within which an extended-reality device can display one or more other visual elements. In particular, an extended-reality lobby window graphical user interface element can refer to a visual element—such as a display area—designated for the display of other visual elements that correspond to users, such as users of a networking system. For example, an extended-reality lobby window graphical user interface element can include a display area within which an extended-reality device associated with a user of a networking system can display visual elements associated with one or more co-users of the networking system, such as animated visual representations of the co-users, visual elements representing connections between the user and the co-users, and/or visual elements corresponding to digital objects sent by the co-users. In particular, the extended-reality lobby window graphical user interface element can provide a view into an extended-reality lobby in which avatars of other users can reside and with which a user can interact to initiate a communication session.

Additionally, as used herein, the term "animated visual representation" refers to an animated visual element. In particular, an animated visual representation can refer to a visual element that represents a real-world object, entity, or idea and can move or be caused to move within a display area. For example, an animated visual representation can include an animated visual element representing a user of a networking system, such as an animated avatar, bot, or caricature.

Further, as used herein, the term "extended-reality communication session" refers to communications between two users in an extended reality environment. In particular, an extended-reality communication session can refer to a communication session (e.g., a chat) between two users using extended-reality devices. For example, an extended-reality communication session can include a discussion between two users using animated visual representations in a virtual room. An extended-reality communication session can further include a discussion of a user with an animated visual representation of a co-user displayed within an extended-reality lobby window graphical user interface element. Relatedly, as used herein, the term "invitation to an extended-reality communication session" refers to an electronic communication—such as an electronic message or notification—that invites or requests a user to join an extended-reality communication session.

As used herein, the term "connection" refers to a link or association between two individuals. In particular, a connection can refer to a link between two users of a networking system. For example, a connection can refer to a relationship between two users (e.g., a professional relationship or a social relationship), a previous communication between or involving the two users, or an association or relatedness of tasks within which the two users are or have been engaged.

Additionally, as used herein, the term "user input" refers to input provided by a user to a computing device. In particular, user input can refer to data that is received or recognized by a computing device—such as an extended-reality device-based on an interaction of a user with the computing device or based on some observation of the user by the computing device. For example, a user input can include, but is not limited to, a touch input provided by a user, a digital video or image captured of the user, a scan of a user, or a voice or other noise input provided by the user. As used herein, the term "voice input" refers to a noise input that originates from the mouth or vocals of a user. For example, voice input can include one or more words spoken by a user, other noises vocalized by the user (e.g., humming or whistling), or other noises caused by manipulations of the user's mouth or lips (e.g., a smacking of the lips).

As used herein, the term "name" refers to a word or set of words by which a person or other entity is known. In particular, a name refers to an identifier that can be used to call out to or refer to a person or an identifier to which a person will respond. For example, a name can refer to a legal name, a nickname, a preferred name, username, or a title.

Additionally, as used herein, the term "availability status" (or "availability") refers to an availability to communicate. In particular, an availability status can refer to a categorization of an availability of a user to engage in conversation with another user. For example, an availability status can refer to a categorization of an availability to engage in an ad hoc, unscheduled, or otherwise unplanned conversation. To illustrate, an availability status can include a category of availability associated with a user of an extended-reality device to engage in an extended-reality communication session.

As used herein, the term "organization" refers to an organized group of multiple people. In particular, an organization can refer to an organized body of people having a shared purpose or directive. For example, an organization can include a business (e.g., a company) or organized group within a business (e.g., a particular department), a partnership, or other operation that involves multiple people operating in an organized manner. Relatedly, as used herein, the term "organizational structure" refers to the structure of an organization. In particular, a structural organization can refer to an arrangement of and relationships between different components (e.g., people and/or groups of people) of an organization. For example, an organizational structure can include a hierarchical structure of an organization (e.g., a corporate hierarchy).

As used herein, the term "community" refers to an association between multiple users in a networking system. In particular, a community can refer to an organized group that includes multiple uses of a networking system that are connected or otherwise associated. For example, a community can include a group of networking system users that are working on related tasks, have similar interests or hobbies, live in the same geographic location or near one another, work within the same organization or department within an organization, have similar educational backgrounds, went to the same school, grew up in the same hometown, etc.

Additionally, as used herein, the term "digital activity" refers to an activity engaged in using a computing device. In particular, a digital activity can refer to an action performed by a user of a computing device, using functions and features of the computing device. Possible digital activities vary with the capabilities of a computing device, but some examples of a digital activity can include accessing, viewing, or editing a digital file (e.g., a digital document or digital video). Further examples include communicating with another user of a computing device (e.g., via email, text, chat, video conference call, etc.), conducting an internet search, accessing a website or general internet browsing, searching a database, or other actions executed as part of a workflow. In one or more embodiments, a digital activity includes a physical activity that has been digitally detected. For example, the extended-reality communication system can receive digital data from a measuring mechanism of a computing device (e.g., a visual sensor, an accelerometer, etc.) and determine that the digital data corresponds to physical activity.

Further, as used herein, the term "task" refers to a piece of work to be performed. In particular, a task can refer to a process taken to arrive at an end result or reach a goal. To illustrate, a task can include, but is not limited to, a work project, research, experimentation, writing a paper, or designing a product.

As used herein, the term "task profile" refers to a collection of data corresponding to one or more tasks associated with a user. In particular, a task profile can refer to an outline or a description of one or more tasks in which a user is engaged and/or one or more tasks that are otherwise associated with a user. A task profile can include a list of digital activities, in which the user has engaged, indicating a task. A task profile can further include data associated with digital activities (e.g., metadata), such as file names, file descriptions, search terms or keywords, website addresses, database names, news items, or the content of communications between the user and a co-user.

Additionally, as used herein, the term "digital object" refers to a collection of digital data. In particular, a digital object can refer to a collection of digital data that can be accessed, viewed, manipulated, or transferred collectively. For example, a digital object can refer to a digital file (e.g., a digital document, a digital image, a digital video, etc.) or a component or derivative of a digital file (e.g., a clip of a digital video or an edited digital image). A digital object can also refer to other digital components that can be utilized by users of a computing device. To illustrate, a digital object can refer to a digital add-on (e.g., an accessory) that can be displayed in association with an animated visual representation of a user or a particular animation that can be applied to the animated visual representation of the user.

Further, as used herein, the term "message" refers to a unilateral communication between entities. In particular, a message can refer to a one-way communication transmitted between computing devices, such as extended-reality devices. For example, a message can refer to a text message, an email message, a chat message, a voice recording, or a video recording.

Additional detail regarding the extended-reality communication system will now be provided with reference to the figures. For example, FIG. 1 illustrates a schematic diagram of an exemplary system 100 in which an extended-reality communication system 106 can be implemented. As illustrated in FIG. 1, the system 100 includes a server(s) 102, a network 108, a third-party server 110, and client devices 112a-112n.

Although the system 100 of FIG. 1 is depicted as having a particular number of components, the system 100 can have any number of additional or alternative components (e.g., any number of servers, client devices, third-party servers, or other components in communication with the extended-reality communication system 106 via the network 108). Similarly, although FIG. 1 illustrates a particular arrangement of the server(s) 102, the network 108, the third-party server 110, and the client devices 112a-112n, various additional arrangements are possible.

The server(s) 102, the network 108, the third-party server 110, and the client devices 112a-112n may be communicatively coupled with each other either directly or indirectly (e.g., through the network 108, networks are discussed in greater detail below in relation to FIG. 10). Moreover, the server(s) 102, the third-party server 110, and the client devices 112a-112n may include a variety of computing devices (including one or more computing devices as discussed in greater detail with relation to FIG. 10).

As mentioned above, the system 100 includes the server(s) 102. The server(s) 102 can generate, store, receive, and/or transmit data including communications data. For example, the server(s) 102 can receive user input from a client device (e.g., one of the client devices 112a-112n) and transmit the communication to another client device. In one or more embodiments, the server(s) 102 comprises a data server. The server(s) 102 can also comprise a communication server or a web-hosting server.

As shown in FIG. 1, the server(s) 102 includes a networking system 104. In particular, the networking system 104 can provide a digital platform that includes functionality through which users of the networking system 104 can connect to and/or interact with one another. For example, the networking system 104 can register a user (e.g., a user of one of the client devices 112a-112n). The networking system 104 can further provide features through which the user can connect to and/or interact with co-users. For example, the networking system 104 can provide messaging features and/or chat features through which a user can communicate with one or more co-users. The networking system 104 can also generate and provide groups and communities through which the user can associate with co-users.

In one or more embodiments, networking system 104 comprises a social networking system (such as but not limited to FACEBOOK™), but in other embodiments the networking system 104 may comprise another type of system, including but not limited to an e-mail system, search engine system, e-commerce system, banking system, or any number of other system types that use user accounts. In one or more embodiments where the networking system 104 comprises a social networking system, the networking system 104 may include a social graph system for representing and analyzing a plurality of users and concepts. A node storage of the social graph system can store node information comprising nodes for users, nodes for concepts, and nodes for items. An edge storage of the social graph system can store edge information comprising relationships between nodes and/or actions occurring within the social networking system. Further detail regarding social networking systems, social graphs, edges, and nodes is presented below with respect to FIGS. 11 and 12.

Additionally, the server(s) 102 include the extended-reality communication system 106. In particular, in one or more embodiments, the extended-reality communication system 106 utilizes the server(s) 102 to enable users to request to communicate with one another in an extended-reality communication session. For example, the extended-reality communication system 106 can utilize the server(s) 102 to receive user input corresponding to a particular co-user and send an invitation to join an extended-reality communication session to an extended-reality device corresponding to the co-user.

For example, in one or more embodiments, the extended-reality communication system 106, via the server(s) 102, generates an extended-reality lobby window graphical user interface element for display on an extended-reality device (e.g., one of the client devices 112a-112n) corresponding to a user of a networking system. The extended-reality communication system 106 further, via the server(s) 102, determines a connection between the user and a co-user. Based on the connection, the extended-reality communication system 106 provides an animated visual representation of the co-user for display within the extended-reality lobby visible via the extended-reality lobby window graphical user interface element displayed on the extended-reality device corresponding to the user. Via the server(s) 102, the extended-reality communication system 106 receives user input targeting the animated visual representation of the co-user and generates and sends an invitation to join an extended-reality communication session for display on an extended-reality device corresponding to the co-user.

In one or more embodiments, the third-party server 110 stores and/or provides access to various third-party sources of digital data. For example, in one or more embodiments, the third-party server 110 can be accessed by a client device (e.g., one of the client devices 112a-112n). In response, the third-party server 110 can provide functionality by which the client device can generate, access, view, search for, and/or interact with digital data. In one or more embodiments, the third-party server 110 includes a database storing digital files (e.g., digital documents, digital images, digital videos, etc.). In some embodiments, the third-party server 110 includes a search engine that provides search results in response to receiving a search query.

In one or more embodiments, the client devices 112a-112n include computing devices that can facilitate communication between users of a networking system via an extended reality environment. For example, the client devices 112a-112n can include head-mounted display devices (including those capable of providing an extended reality display), smartphones, tablets, desktop computers, laptop computers, or other electronic devices having extended reality capabilities. The client devices 112a-112n can include one or more applications (e.g., the client application 114) that can facilitate communication between users of a networking system via an extended reality environment. For example, the client application 114 can include a software application installed on the client devices 112a-112n. Additionally, or alternatively, the client application 114 can include a software application hosted on the server(s) 102, which may be accessed by the client devices 112a-112n through another application, such as a web browser.

The extended-reality communication system 106 can be implemented in whole, or in part, by the individual elements of the system 100. Indeed, although FIG. 1 illustrates the extended-reality communication system 106 implemented with regard to the server(s) 102, different components of the extended-reality communication system 106 can be implemented in a variety of the components of the system 100. For example, one or more (or all) components of the extended-reality communication system 106 can be implemented by a different computing device (e.g., one of the client devices 112a-112n) or a separate server from the server(s) 102 hosting the networking system 104. Example components of the extended-reality communication system 106 will be discussed in more detail below with regard to FIG. 8.

Figure 2:
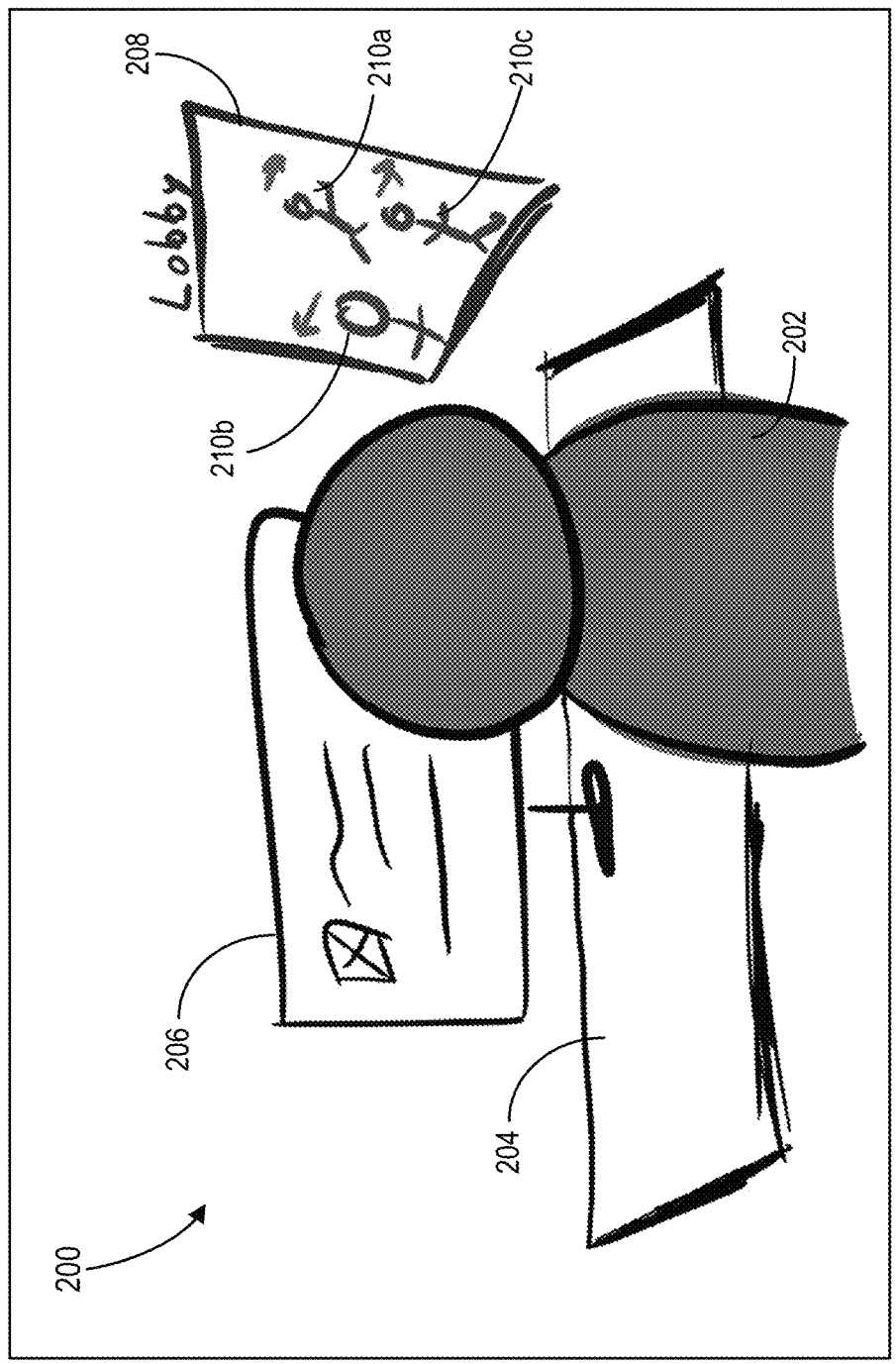
FIG. 2 illustrates an overview diagram of the extended-reality communication system providing animated visual representations of co-users within an extended-reality lobby window for display via an extended-reality device of a user in accordance with one or more embodiments.

As mentioned above, the extended-reality communication system 106 can generate an extended-reality lobby window graphical user interface element for display on an extended-reality device corresponding to a user. FIG. 2 illustrates an overview diagram of the extended-reality communication system 106 providing a generated extended-reality lobby window graphical user interface element for display in accordance with one or more embodiments.

As shown in FIG. 2, the extended-reality communication system 106 can provide a virtual reality environment 200 in which a user wearing an extended-reality device is represented by, and controls, an avatar 202. In other words, the extended-reality device can provide the user a view of the virtual reality environment 200 from the point of view of the avatar 202. In the embodiment shown in FIG. 2, the virtual reality environment includes a virtual desk 204 and a virtual computer 206. In alternative embodiments, the virtual reality environment 200 can comprise any number of configurations and situations. For example, rather than generating and providing a virtual reality environment, the extended-reality communication system 106 can provide an augmented reality environment that mixes virtual and real-life objects (in such an augmented reality environment, the illustrated avatar 202 would be replaced by the user wearing an augmented-reality device).

FIG. 2 further illustrates that the extended-reality device can provide an extended-reality lobby window graphical user interface element 208. Additionally, as shown in FIG. 2, the extended-reality communication system 106 provides animated visual representations 210a-210c for display within the extended-reality lobby window graphical user interface element 208. Although FIG. 2 shows a particular number of animated visual representations, the extended-reality communication system 106 can provide various numbers of animated visual representations (i.e., one or more).

In one or more embodiments, the animated visual representations 210a-210c correspond to co-users of a networking system of which the user of the extended-reality device is also a user. In some embodiments, the extended-reality communication system 106 provides the animated visual representations 210a-210c based on a determined connection between the corresponding co-users and the user of the extended-reality device. In further embodiments, the extended-reality communication system 106 provides the animated visual representations 210a-210c based on an availability status of the corresponding co-users. In one or more embodiments, rather than providing the animated visual representations 210a-210c, the extended-reality communication system 106 provides static visual elements representing the co-users of the networking system.

In one or more embodiments, the extended-reality communication system 106 receives an animated visual representation from the corresponding co-user. For example, the extended-reality communication system 106 can provide an interface through which the co-user can customize the look of their corresponding animated visual representation or submit an animated visual representation generated using a third-party system. In some embodiments, the extended-reality communication system 106 generates the animated visual representation for a co-user based on a scan of the face and body of the co-user.

The extended-reality communication system 106 can provide different variations of the extended-reality lobby window graphical user interface element 208 and/or the animated visual representations 210a-210c. For example, as shown in FIG. 2, the extended-reality communication system 106 can present the extended-reality lobby window graphical user interface element 208 as a window into a lobby and the animated visual representations 210a-210c walking or otherwise moving through the lobby. As another example, the extended-reality communication system 106 can present the extended-reality lobby window graphical user interface element 208 as a view of a river and the animated visual representations 210a-210c as drifting, boating, or swimming along the river.

In one or more embodiments, the extended-reality communication system 106 positions the extended-reality lobby window graphical user interface element 208 within the extended reality graphical user interface 206 so as to appear at the side or periphery of the view of the user when the user faces a particular direction. For example, as shown in FIG. 2, the extended-reality communication system 106 can position the extended-reality lobby window graphical user interface element 208 to appear at the side when the user faces toward the computer 206. Thus, the extended-reality lobby window graphical user interface element 208 can appear as a window positioned next to the user (e.g., on a wall next to the user).

In augmented reality environments, the extended-reality communication system 106 can further anchor the extended-reality lobby window graphical user interface element 208 to a real-world location (e.g., on the wall next to the user) so that the user can face the extended-reality lobby window graphical user interface element 208 directly when desired. Accordingly, the extended-reality communication system 106 enables the user to see the extended-reality lobby window graphical user interface element 208 without obstructing the view of the computing device 206, allowing the user to focus on a task to be performed but facilitating communication with co-users when desired.

The animated visual representations 210a-210c can comprise representations of co-users. It should be noted, however, that in contrast to avatars (e.g., avatar 202), the animated visual representations 210a-210c are not directly controlled by users. In other words, the animated visual representations 210a-210c can be located within the virtual lobby visible via the extended-reality lobby window graphical user interface element 208 without requiring users associated with the animated visual representations 210a-210c to navigate into the virtual lobby. Thus, similar to the user associated with the avatar 202, the users associated with the animated visual representations 210a-210c can be working or otherwise engaged.

Figure 3A:
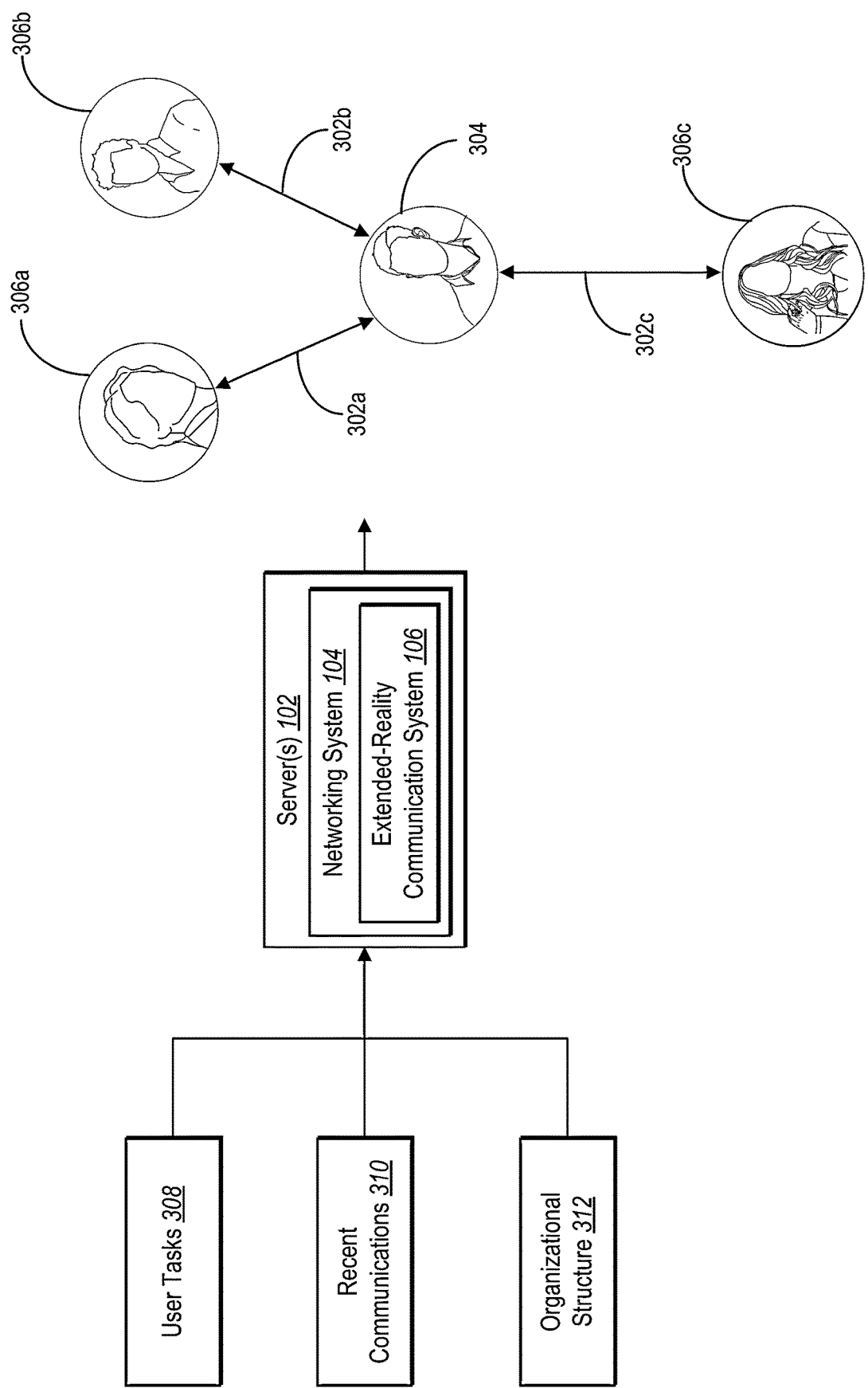
FIGS. 3A-3B illustrate diagrams for determining connections between a user and co-users in accordance with one or more embodiments.
Figure 3B:
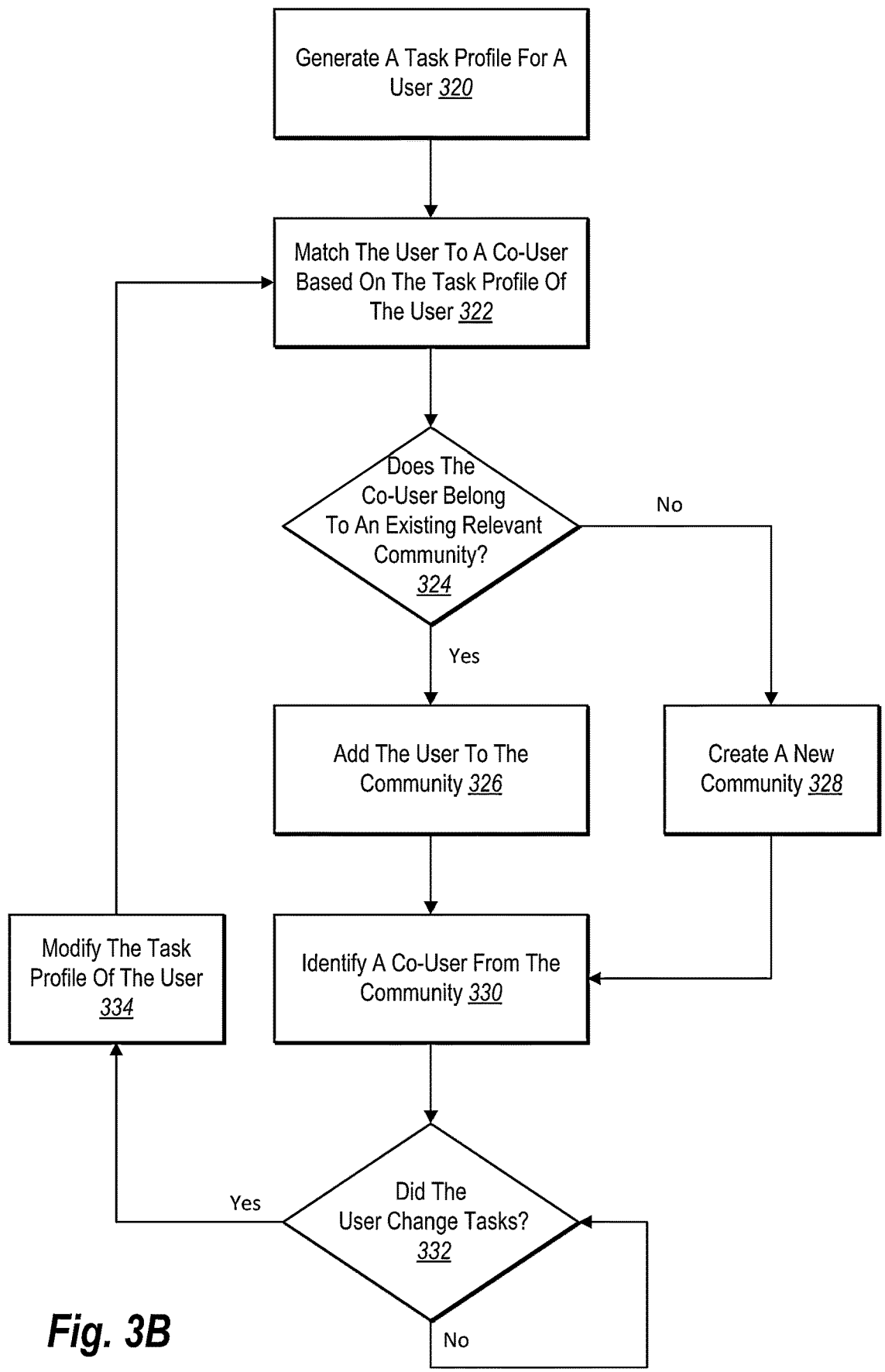

As mentioned above, the extended-reality communication system 106 can determine a connection between a user and a co-user and provide an animated visual representation of the co-user for display on an extended-reality device of the user based on that connection. FIGS. 3A-3B illustrate diagrams for determining connections between a user and co-users in accordance with one or more embodiments.

In particular, FIG. 3A illustrates a block diagram for determining connections 302a-302c between a user 304 and a plurality of co-users 306a-306c. In one or more embodiments, the user 304 and the co-users 306a-306c are users of a networking system. Though FIG. 3A illustrates determining connections between the user 304 and a particular number of co-users, the extended-reality communication system 106 can determine connections between the user 304 and various numbers of co-users (i.e., one or more).

For a given co-user (e.g., one of the co-users 306a-306c), the extended-reality communication system 106 can determine a connection between the user 304 and the co-user based on various factors or data. For example, as shown in FIG. 3A, the extended-reality communication system 106 can determine a connection based on user tasks 308. In one or more embodiments, the user tasks 308 include one or more tasks associated with the user 304. Indeed, the extended-reality communication system 106 can determine a task associated with or details related to a task associated with the user. In one or more embodiments, the extended-reality communication system 106 determines the task based on one or more digital activities (including digitally-detected physical activities) executed by the user. Similarly, the extended-reality communication system 106 can determine a task or details related to a task associated with the co-user. The extended-reality communication system 106 can determine a connection between the user 304 and the co-user based on a similarity between their associated tasks. By determining a connection between the user and a co-user based on task similarity (and providing an animated visual representation of the co-user for display to the user accordingly), the extended-reality communication system 106 can facilitate increased awareness, for a user, of co-users that are working in the same task area.

In one or more embodiments, the extended-reality communication system 106 adds the user 304 to a community of co-users associated with similar tasks. Accordingly, the extended-reality communication system 106 can determine a connection between the user 304 and a co-user that is part of the community as will be discussed in more detail below with regard to FIG. 3B.

As shown in FIG. 3A, the extended-reality communication system 106 can further determine a connection between the user 304 and a co-user based on recent communications 310 between the user 304 and the co-user. For example, the extended-reality communication system 106 can track and/or maintain a record of communications between the user 304 and the co-user. For example, the extended-reality communication system 106 can track communications exchanged within a networking system (e.g., posts, direct messages, chats, comments, replies, etc.). In one or more embodiments, the extended-reality communication system 106 also tracks communications exchanged outside of a networking system (e.g., emails, phone calls, text messages, video chats, etc.). In some embodiments, the extended-reality communication system 106 further receives input corresponding to face-to-face communications between the user 304 and the co-user.

In one or more embodiments, the extended-reality communication system 106 determines a connection between the user 304 and the co-user based on those communications that are considered recent—such as communications exchanged within a recency threshold (e.g., within a week, a month, several months, etc.). In some instances, however, the extended-reality communication system 106 can determine a connection based on a broader range of communications exchanged between the user 304 and the co-user. For example, the extended-reality communication system 106 can analyze various communications exchanged between the user 304 and the co-user from a broad timeline and assign a weight to each communication based on the recency of the communication.

Additionally, as shown in FIG. 3A, the extended-reality communication system 106 can determine a connection between the user 304 and a co-user based on an organizational structure 312 associated with the user 304. Indeed, the extended-reality communication system 106 can identify the organizational structure 312 corresponding to an organization associated with the user 304. In one or more embodiments, the co-user is also associated with the organization and is associated with the user 304 through the organization (e.g., is a supervisor, a subordinate, or colleague of the user 304). The extended-reality communication system 106 can identify the connection between the user 304 and the co-user using the organizational structure.

In one or more embodiments, the extended-reality communication system 106 generates a tree map that includes the organizational structure 312. In particular, the extended-reality communication system 106 can generate a tree map that indicates the various components of the organization and how they relate to one another. The extended-reality communication system 106 can further generate the tree map to include representations of users of the networking system associated with the different components. Thus, the extended-reality communication system 106 can determine a connection between the user 304 and a co-user by analyzing the tree map. For example, the extended-reality communication system 106 can determine that there is a connection with a co-user that is associated with the same organizational component as the user 304. In one or more embodiments, the extended-reality communication system 106 generates the tree map as described in Douglas Baxter, Creating a Treemap Chart Using JavaScript, https://www.anychart.com/blog/2019/08/01/treemap-chart-create-javascript/, 2019, which is incorporated herein by reference in its entirety.

In some embodiments, the extended-reality communication system 106 generates a knowledge graph that includes the organizational structure 312. In particular, the extended-reality communication system 106 can generate a knowledge graph that indicates the various concepts and/or categories that are relevant to the organization associated with the user 304 and how those concepts and/or categories are related. The extended-reality communication system 106 can further generate the knowledge graph to indicate the users of the networking system associated with the concepts and/or categories. Thus, the extended-reality communication system 106 can determine the connection between the user 304 and a co-user by analyzing the knowledge graph. In one or more embodiments, the extended-reality communication system 106 generates a knowledge graph as described in Ignaz Wanders, *Build Your Own Knowledge Graph*, https://medium.com/vectrconsulting/build-your-own-knowledg-graph-975cf6dde67f, 2018 which is incorporated herein by reference in its entirety.

The extended-reality communication system 106 can apply various filters to the knowledge graph (e.g., filters selected by a user) in order to focus on the types of connections the user desires (e.g., past or present co-users associated with the same or similar task, connections that will help with commercial profit or intellectual property protection, etc.)

In one or more embodiments, the extended-reality communication system 106 determines a connection between the user 304 and a co-user based on any one of the user tasks 308, the recent communications 310, or the organizational structure 312. In other words, the extended-reality communication system 106 can determine that a connection exists as long as the user 304 and the co-user were associated with similar tasks, had recently communicated with one another, or were associated through an organization. In some embodiments, however, the extended-reality communication system 106 determines that a connection between the user 304 and a co-user exists based on a combination of the user tasks 308, the recent communications 310, and the organizational structure 312 (or uses such a combination to determine the strength of the connection).

FIG. 3B illustrates a flowchart for a process of determining a connection between a user and a co-user based on the user and co-user being members of the same community in accordance with one or more embodiments. As shown in FIG. 3B, the extended-reality communication system 106 can perform an act 320 of generating a task profile for a user. In particular, the extended-reality communication system 106 can generate the task profile based on one or more digital activities executed by the user. In some instances, the extended-reality communication system generates a task profile for a user by generating a semantic profile based on the digital activities executed by the user and/or the data associated with those digital activities. For example, the extended-reality communication system 106 can generate a semantic profile for a user as described in Semantic Arts, White Paper: Semantic Profiling, https://www.semanticarts-.com/white-paper-semantic-profiling/, 2015, which is incorporated herein by reference in its entirety.

In some instances, the extended-reality communication system 106 generates a task profile based on user input. In particular, the extended-reality communication system 106 can provide an interface for display on the extended-reality device of the user (or another computing device associated with the user) through which the user can input information. The extended-reality communication system 106 can then generate a task profile for the user based on the provided information.

In one or more embodiments, the extended-reality communication system 106 generates multiple task profiles for a user. For example, the extended-reality communication system 106 can generate a first task profile related to tasks associated with an employment of the user and a second task profile related to tasks associated with non-employment activities of the user. As another example, the extended-reality communication system 106 can generate multiple task profiles related to separate and unrelated tasks associated with an employment of the user, such as when the user fills multiple roles within a business that employs the user or where the user is part of an academic circle that is related to the employment of the user (e.g., a college professor that participates in academic circles related to an employed field of study).

Additionally, as shown in FIG. 3B, the extended-reality communication system 106 can perform an act 322 of matching the user to a co-user based on the task profile of the user. For example, in one or more embodiments, the extended-reality communication system 106 matches a user to a co-user based on a similarity between their respective task profiles. Indeed, the extended-reality communication system 106 can compare the task profile of the user to the task profile of the co-user to determine a similarity between the task profiles. In some embodiments, the extended-reality communication system 106 generates a similarity score between the task profiles and determines that the user and the co-user match if the similarity score satisfies a threshold.

In some embodiments, the extended-reality communication system 106 matches the user to a co-user based on a similarity between the tasks represented by their respective task profiles. For example, the extended-reality communication system 106 can determine a task represented by each task profile (e.g., by applying the task profile to a trained classifier) and compare the tasks determined for each task profile. The extended-reality communication system 106 can determine that the user and the co-user match if the determined tasks are equal or if a similarity score determined for the tasks satisfies a threshold.

As further shown in FIG. 3B, the extended-reality communication system 106 can perform an act 324 of determining whether the co-user belongs to an existing relevant community. For example, the extended-reality communication system 106 can determine whether the co-user belongs to an existing community within the networking system. The extended-reality communication system 106 can determine that an existing community is relevant if it is associated with the task profile (or the task determined from the task profile) associated with the user.

If the extended-reality communication system 106 determines that the co-user belongs to an existing relevant community, the extended-reality communication system 106 can perform an act 326 of adding the user to the community. In one or more embodiments, the extended-reality communication system 106 adds the user to the community after matching the user to one co-user from the community. In some embodiments, the extended-reality communication system 106 adds the user to the community based on matching the user to multiple co-users from the community.

Further, in some instances, the extended-reality communication system 106 determines that the co-user belongs to multiple existing relevant communities. Accordingly, the extended-reality communication system 106 can add the user to those multiple communities based on matching the user to the co-user.

If the extended-reality communication system 106 determines that the co-user does not belong to an existing relevant community, the extended-reality communication system 106 can perform an act 328 of creating a new community. The extended-reality communication system 106 can further add the user and the co-user as members of the new community. The extended-reality communication system 106 can further add other co-users to the community based on determining that the other co-users match the user and/or the co-user.

Upon adding the user to an existing relevant community or creating a new community, the extended-reality communication system 106 can perform an act 330 of identifying a co-user from the community. In particular, the extended-reality communication system 106 can determine that there is a connection between the user and a co-user identified from the community. In one or more embodiments, the extended-reality communication system 106 identifies a plurality of co-users from the community and determines that there is a connection between the user and the plurality of co-users identified from the community.

In some embodiments, the extended-reality communication system 106 determines that there is a connection between the user and the co-user with whom the extended-reality communication system 106 previously matched to the user at the time of matching (e.g., in act 322). In some embodiments, however, the extended-reality communication system 106 determines the connection after adding the user to a community.

As shown in FIG. 3B, the extended-reality communication system 106 can further perform an act 332 of determining whether the user changed tasks. In particular, the extended-reality communication system 106 can track the digital activities of the user as the user executes those digital activities. The extended-reality communication system 106 can further detect when the digital activities executed by the user correspond to a different task than previously executed digital activities (e.g., based on a relatedness of the digital activities). In other words, the extended-reality communication system 106 can maintain a record of the current task of the user and identify when that current task changes. If, at a given time, the extended-reality communication system 106 determines that the user has not changed tasks, the extended-reality communication system 106 can continue to monitor the digital activities of the user until there is a task change.

If the extended-reality communication system 106 determines that the user has changed tasks, the extended-reality communication system 106 can perform an act 334 of modifying the task profile of the user. Indeed, the extended-reality communication system 106 can update the task profile of the user to correspond to the current task of the user. Thus, the extended-reality communication system 106 can dynamically update the task profile of a user and add the user to communities (or create new communities) that are relevant to the current task of the user. Because these communities include co-users that have similar task profiles to the user, the extended-reality communication system can utilize the communities of the user to identify connections with co-users that are engaged in tasks that are similar to the task with which the user is currently engaged.

In some embodiments, the extended-reality communication system 106 determines that the user switches between two or more tasks with a frequency that satisfies a frequency threshold. The extended-reality communication system 106 can determine that the two or more tasks belongs to the same task group and modify the task profile of the user to reflect the task group accordingly. Thus, the extended-reality communication system 106 can determine connections between the user and co-users engaging in the same task group.

By adding the user to communities that are relevant to the current task of the user, the extended-reality communication system 106 can improve the time spent by the user working on the task. For example, the extended-reality communication system 106 can facilitate a more social work environment that enables the user to interact with co-users. More specifically, the extended-reality communication system 106 can enable the user to interact with co-users that may be willing to collaborate on the task (e.g., including co-users of other disciplines that may be willing to collaborate) or co-users that can provide an expertise related to the task. Further, the extended-reality communication system 106 can reduce interruptions as well as the duplication of efforts by the user as interacting with co-users engaged in a similar problem space has a low task-switch cost.

In some embodiments, rather than strictly determining that the user changed from one task to another task, the extended-reality communication system 106 determines that the user is engaged in a task that is narrower than previously determined. For example, the extended-reality communication system 106 can determine that the task of the user is a sub-category of the task previously determined for the user (e.g., the user is studying a particular facet of a category rather than the broad category itself). Accordingly, the extended-reality communication system 106 can modify the task profile of the user to reflect the narrower task of the user and can add the user to a community that is specifically directed to the narrower task accordingly.

In some embodiments, the extended-reality communication system 106 determines that the user changed tasks (or that the user is engaged in a task that is narrower than previously determined) based on detecting that the user has engaged with a co-user. In other words, the extended-reality communication system 106 can determine that two or more users working together is a different task than one user working in isolation. In some instances, however, the extended-reality communication system 106 views the task the same regardless of the number of users working together.

Further, in some instances, rather than generate task profiles for each user of the networking system and adding users to communities based on their respective task profiles, the extended-reality communication system 106 can group users into communities using a trained machine learning model. Indeed, the extended-reality communication system 106 can utilize a trained machine learning model to analyze the digital activities of a user (e.g., chats, searches, documents read or created, videos watched, etc.) and add the user to a community based on the analysis. In this manner, the extended-reality communication system 106 can group users without an understanding of the digital activities executed by those users.

In some embodiments, the extended-reality communication system 106 determines, for a user, connections to co-users beyond those that are currently engaged in the same or a similar task as the user. For example, the extended-reality communication system 106 can determine connections to co-users that have engaged in the same or a similar task in the past, such as those who were engaged in the same task while associated with an organization of the user but have since left. Thus, the extended-reality communication system 106 enables a user to communicate with a broad range of users who may be helpful with a particular task. In some embodiments, rather than facilitating communication with co-users who have worked on the same or a similar task in the past, the extended-reality communication system 106 provides the user with materials associated with those co-users (e.g., documents, searches, publications, or other work artifacts) to inform the user of previous findings, dead ends, insights, etc.

In some instances, the extended-reality communication system 106 determines that the user is not connected to a co-user of the networking system. In particular, the extended-reality communication system 106 can determine that the task associated with the user is unique to the user. Accordingly, the extended-reality communication system 106 can flag the task as a new area of discovery. The extended-reality communication system 106 can further flag the task as a subject worthy of intellectual property protection (e.g., patents, copyrights, defensive publications, etc.). The extended-reality communication system 106 can provide a notification for display to the user of the intellectual property potential associated with the task.

In some embodiments, the extended-reality communication system 106 establishes a relationship between two disparate topics based on a unique task. For example, the extended-reality communication system 106 can add the user to a community associated with another task of the user (i.e., a known or non-unique task). The extended-reality communication system 106 can establish a relationship based on a topic of the unique task and a topic of the non-unique task based on determining that the user is associated with both. The extended-reality communication system 106 can use this relationship for future community building.

As discussed above, the extended-reality communication system 106 can provide animated visual representations of co-users for display on an extended-reality device of a user. In response to receiving user input targeting a particular animated visual representation, the extended-reality communication system 106 can initiate communication with the corresponding co-user within an extended reality environment. FIGS. 4A-4E illustrate diagrams for initiating an extended-reality communication session between a user and a co-user corresponding to an animated visual representation in accordance with one or more embodiments.

Figure 4B:
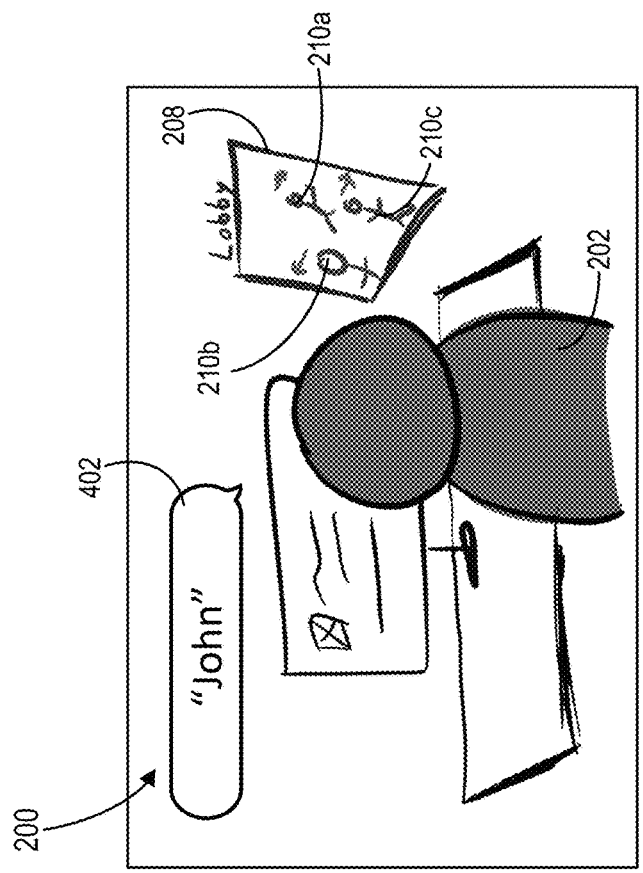
FIGS. 4A-4E illustrate diagrams for initiating an extended-reality communication session between a user and a co-user via an extended-reality lobby window graphical user interface element in accordance with one or more embodiments.
Figure 4A:
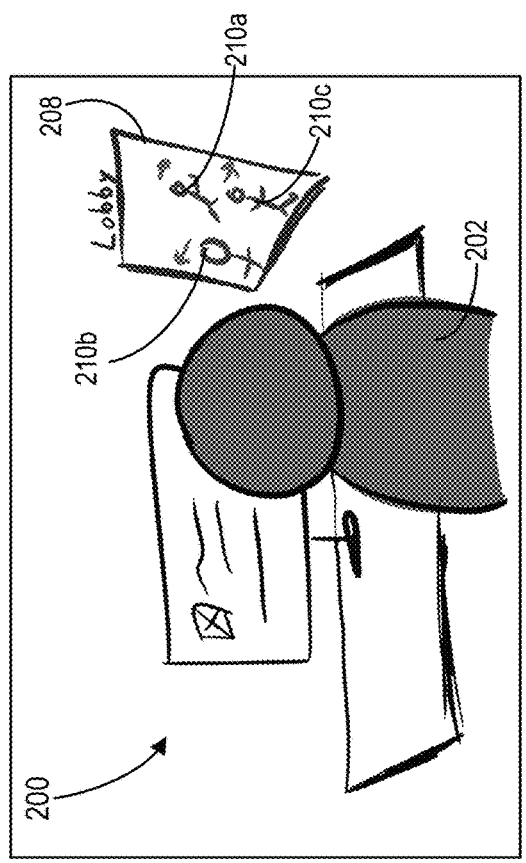

As shown in FIG. 4A, the extended-reality communication system 106 provides the animated visual representations 210a-210c corresponding to co-users of a networking system for display within an extended-reality lobby window graphical user interface element 208 displayed via an extended-reality device of a user associated with an avatar 202. In one or more embodiments, the extended-reality communication system 106 provides the animated visual representations 210a-210c for display within the extended-reality lobby window graphical user interface element 208 based on a determined connection between the user and the co-users corresponding to the animated visual representations 210a-210c.

In some embodiments, the extended-reality communication system 106 determines that there is a connection between the user and a plurality of co-users—more than the number of animated visual representations that could be practically displayed within the extended-reality lobby window graphical user interface element 208. Accordingly, the extended-reality communication system 106 can select a subset of co-users at a given time and provide their corresponding animated visual representations for display within the extended-reality lobby window graphical user interface element 208. In some instances, the extended-reality communication system 106 further alternates or rotates through the animated visual representations provided for display so that the animated visual representation of each co-user from the plurality of co-users is displayed within the extended-reality lobby window graphical user interface element 208 at some point.

In some embodiments, the extended-reality communication system 106 further provides animated visual representations for display based on an availability status of the corresponding co-users. For example, the extended-reality communication system 106 can receive user input from a co-user (e.g., via an extended-reality device of the co-user) indicating the availability of the co-user for discussion. For example, the extended-reality communication system 106 can provide availability options (e.g., available or unavailable) for display on the extended-reality device of the co-user and receive a selection of one of the options.

In some embodiments, the extended-reality communication system 106 provides a visual element for display on the extended-reality device of the co-user based on the user input indicating the unavailability of the co-user. For example, the extended-reality communication system 106 can provide digital blinds for display over an extended-reality lobby window graphical user interface element displayed on the extended-reality device of the co-user, indicating that the co-user has decided on an unavailable status. As another example, the extended-reality communication system 106 can provide a digital "do not disturb" sign for display so as to appear to be hanging outside the extended-reality lobby window graphical user interface element or a virtual door displayed on the extended-reality device of the user. Thus, the extended-reality communication system 106 provide visual elements that indicate, to the co-user, the current availability status of the co-user. In some embodiments, such visual elements are not viewed by other co-users (e.g., the user); rather, the visual elements provide a visual indication, to the particular co-user, that the co-user is currently labeled unavailable for communication.

In one or more embodiments, if the user input indicates that the co-user is available for discussion, the extended-reality communication system 106 can provide the corresponding animated visual representation for display. If the user input indicates that the co-user is not available for discussion, the extended-reality communication system 106 can exclude the corresponding animated visual representation from display.

In some instances, the extended-reality communication system 106 receives user input indicating that a co-user is unavailable except to discuss one or more particular tasks. Accordingly, the extended-reality communication system 106 can exclude the animated visual representation of the co-user for display unless the user is associated with at least one of the tasks the co-user is willing to discuss.

In one or more embodiments, rather than receiving user input that directly indicates an availability status of a co-user, the extended-reality communication system 106 determines the availability of the co-user based on a digital calendar associated with the co-user. For example, the extended-reality communication system 106 can analyze the digital calendar of the co-user to determine when the co-user has meetings or other scheduled events and can determine that the co-user is unavailable during those times. In some embodiments, the extended-reality communication system 106 utilizes a trained machine learning model to analyze work patterns of the user (e.g., when the user is occupied with meetings or events, when the user is working from a desk, or when the user has discussions with other co-users) and identify one or more time slots when the user will be available.

As shown in FIG. 4B, the extended-reality communication system 106 receives user input 402 targeting the animated visual representation 210c. In particular, the extended-reality communication system 106 receives voice input that includes the name of the co-user corresponding to the targeted animated visual representation 210c. The extended-reality communication system 106, however, can receive user input targeting an animated visual representation in various forms. For example, the extended-reality communication system 106 can receive a selection of an animated visual representation via a controller device associated with the extended-reality device or can perform eye tracking to identify an animated visual representation on which the user has focused. As another example, the extended-reality communication system 106 can detect that the user is waving at, pointing to, or performing some other hand gesture that targets an animated visual representation (e.g., when there is only one animated visual representation displayed within the extended-reality lobby window graphical user interface element 208).

Figure 4D:
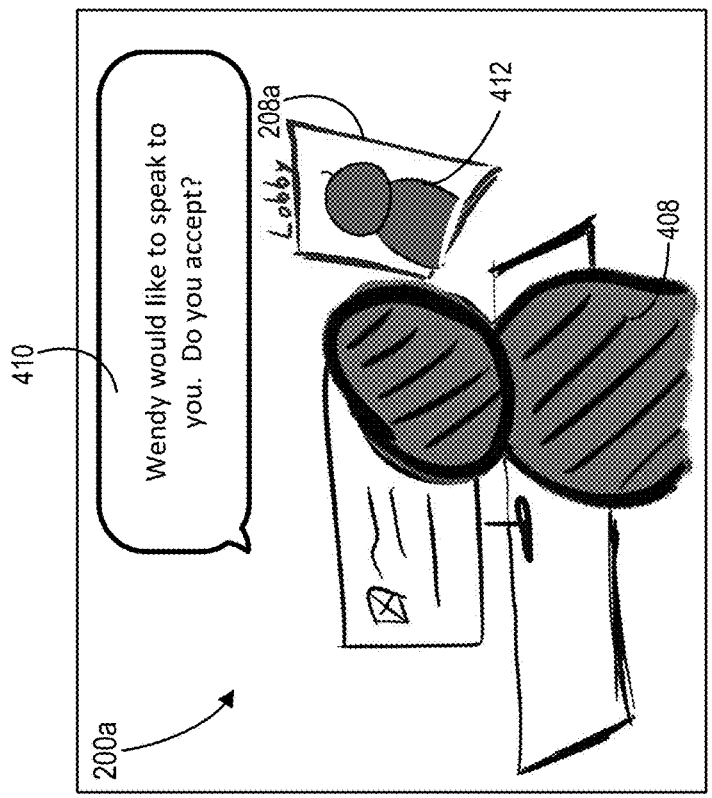
Figure 4C:
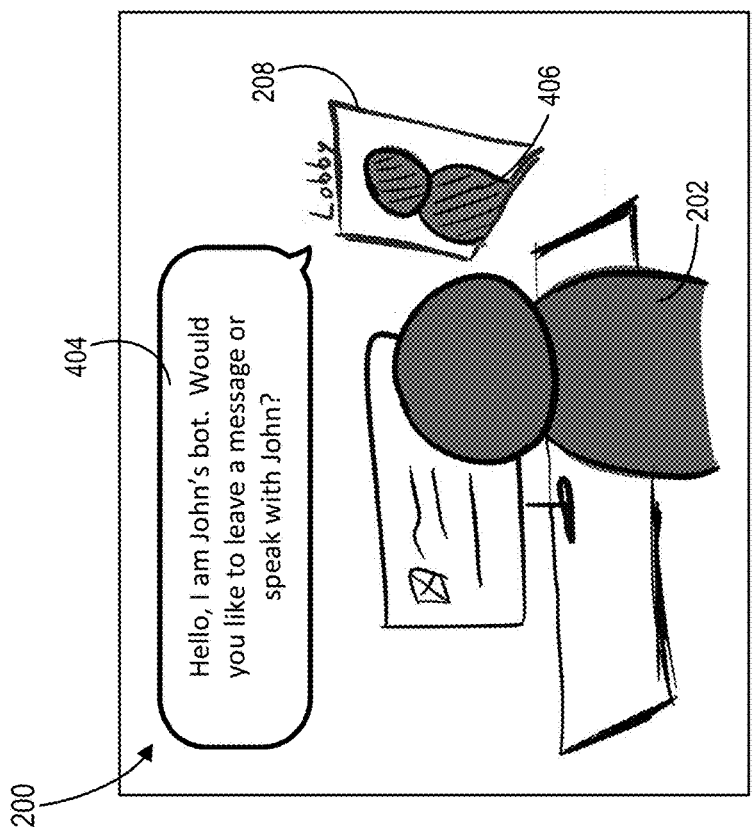

As shown in FIG. 4C, in response to receiving the user input 402 targeting the animated visual representation 210c, the extended-reality communication system 106 provides an enlarged animated visual representation 406 corresponding to the animated visual representation 210c for display within the extended-reality lobby window graphical user interface element 208. Indeed, the extended-reality communication system 106 removes the animated visual representations 210a-210b from the extended-reality lobby window graphical user interface element 208. The extended-reality communication system 106 can utilize the animated visual representation 406 to communicate a first option to send a message for the co-user or a second option to speak with the co-user. In one or more embodiments, the extended-reality communication system 106 utilizes the animated visual representation 406 to communicate additional options, such as sending a digital object to the user, which will be discussed in more detail below with reference to FIG. 6.

In response to receiving a user selection to send a message to the co-user, the extended-reality communication system 106 can provide a prompt for display on the extended-reality device for the user to provide the message. The extended-reality communication system 106 can receive the message through various types of user input (e.g., voice input, text input, etc.) and send the received message to a computing device of the co-user (e.g., the extended-reality device of the co-user.

In some instances, the extended-reality communication system 106 receives user input from multiple users to speak with the co-user at or near the same time. Accordingly, the extended-reality communication system 106 can notify at least some of the users that the co-user is currently occupied. The extended-reality communication system 106 can further request that the users try to initiate communication with the co-user at a later time or can provide an option for the users to send a message to the co-user.

In some embodiments, the extended-reality communication system 106 provides an animated visual representation of a co-user for display to a user even if the co-user is unavailable due to having a day off, due to the co-user working different hours than the user, or due to the co-user otherwise selecting an unavailable status. Accordingly, the extended-reality communication system 106 can provide an option for the user to send a message to the co-user in response to receiving user input targeting the animated visual representation of the co-user.

As shown in FIG. 4D, in response to receiving a user selection to speak with the co-user, the extended-reality communication system 106 generates and sends an invitation to join an extended-reality communication session for display on an extended-reality device of the co-user. In particular, FIG. 4D illustrates extended-reality communication system 106 generating and providing an extended-reality environment 200a for the co-user. As shown, the co-user is represented by an avatar 408. The extended-reality communication system 106 can provide, for display within an extended-reality lobby window graphical user interface element 208a, an animated visual representation 412 of the user to communicate the invitation.

In one or more embodiments, the extended-reality communication system 106 provides a particular animation with the animated visual representation 412 before or during communication of the invitation to indicate that the user would like to speak with the co-user. For example, the extended-reality communication system 106 can cause the animated visual representation 412 to perform the particular animation until the extended-reality communication system 106 has determined that the co-user is facing the animated visual representation 408 directly. To illustrate, the extended-reality communication system 106 can cause the animated visual representation 408 to appear to "knock" on the extended-reality lobby window simulated to by the extended-reality lobby window graphical user interface element 208a, appear to be looking at a wristwatch, hovering within the extended-reality lobby window graphical user interface element 408, or walking past the extended-reality lobby window graphical user interface element 408 with greater frequency. As another example, the extended-reality communication system 106 can cause the animated visual representation 412 to appear to walk through or pace within the extended-reality lobby window graphical user interface element 408. Optionally, in response to receiving user input declining the invitation to join the extended-reality communication session, the extended-reality communication system 106 can send a notice that the invitation was declined for display on the extended-reality device of the user.

Figure 4E:
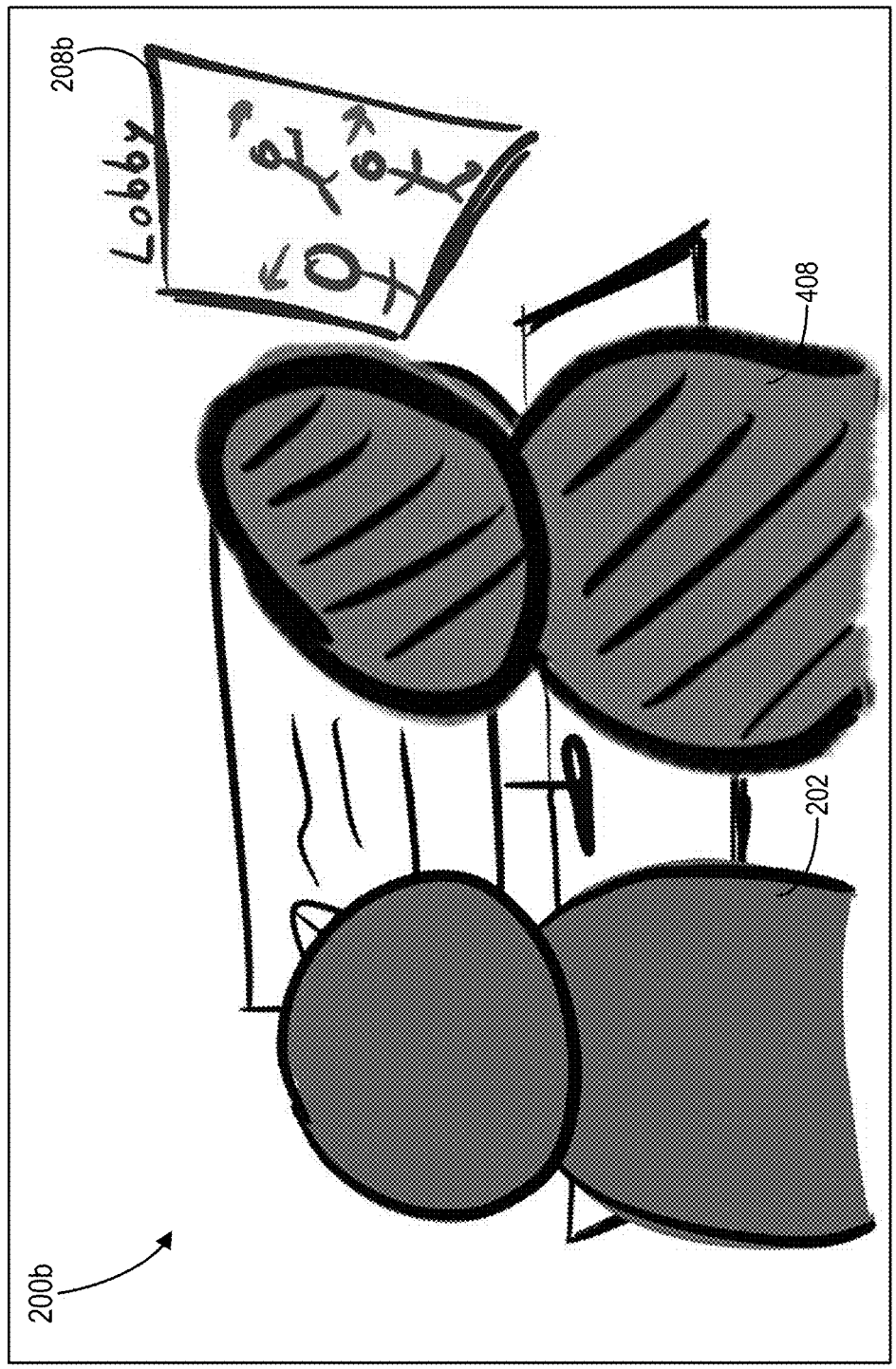

As shown in FIG. 4E, in response to receiving an acceptance of the invitation, the extended-reality communication system 106 can conduct an extended-reality communication session between the extended-reality device of the user and the extended-reality device of the co-user. In one or more embodiments, the extended-reality communication system 106 conducts the extended-reality communication session by generating and providing a combined extended-reality environment 200b in which both the avatars 202 and 408 (and thus the user and co-user) are present. Thus, the user and the co-user can appear to be next to each other's avatar within the combined extended-reality environment 200b and can communicate with each other as if they were both in the same physical room despite the user and the co-user being physically located remote from each other. In some embodiments, the extended-reality communication system 106 provides a prompt for display on the extended-reality device of the user and/or the extended-reality device of the co-user to meet at a physical location in order to conduct an in-person discussion.

In some embodiments, rather than generating the combined extended-reality environment 200b, the extended-reality communication system 106 enables the user and co-user to communicate through the extended-reality lobby window graphical user interface elements displayed on their respective extended-reality devices. For example, the extended-reality communication system 106 can display, within the extended-reality lobby window graphical user interface element displayed on the extended-reality device of the user, the animated visual representation of the co-user. The extended-reality communication system 106 can communicate voice input, from the co-user, to the user via the animated visual representation of the co-user.

In one or more embodiments, upon determining that the user and the co-user have joined an extended-reality communication session, and upon further determining that another user is connected to the user and the co-user (e.g., is working on the same task), the extended-reality communication system 106 can invite the other user to join the extended-reality communication session or prompt the user and/or co-user to do so. Still further, the extended-reality communication system 106 can generate and provide an extended-reality lobby window graphical user interface element 208b in which animated visual representations of co-users connected to both the user and the co-user are provided. Thus, the extended-reality communication system 106 can facilitate the user and the co-user adding additional connected users to the combined extended-reality environment 200b in an impromptu fashion (e.g., an impromptu meeting).

Further, in some embodiments, rather than providing animated visual representations within an extended-reality lobby window graphical user interface element and allowing a user to target an animated visual representation in order to communicate with a corresponding co-user, the extended-reality communication system 106 can generate a virtual room for display on an extended-reality device of the user. The extended-reality communication system 106 can provide animated visual representations for one or more co-users determined to have a connection to the user for display within the virtual room and enable the user to communicate with the one or more co-users via their respective animated visual representations.

In some embodiments, the extended-reality communication system 106 determines that the user is part of a defined group of co-users (e.g., a team of co-workers) and provides the same virtual room for display to each member of the defined group (e.g., instead of providing the extended-reality lobby window graphical user interface element). Thus, the extended-reality communication system 106 can provide a defined virtual space within which members of the defined group can meet and communicate—either as sub-groups or as the entire group—even if the members of the defined group are at separate physical locations.

By utilizing an extended-reality lobby window graphical user interface element to provide animated visual representations of co-users and initiate communication with those co-users, the extended-reality communication system 106 can operate more flexibly than conventional systems. For example, the extended-reality communication system 106 can provide the animated visual representation of a co-user for display to the user without relying on user input from the co-user as is often required by conventional systems. Further, by utilizing an extended-reality lobby window graphical user interface element for displaying the animated visual representations, the extended-reality communication system 106 flexibly allows the user to encounter the animated visual representations without requiring the user to actively seek for a dedicated extended reality arena. Thus, the extended-reality communication system 106 can simulate a chance encounter between the user and one or more co-users.

Further, the extended-reality communication system 106 can operate more efficiently than conventional systems. Indeed, by providing the animated visual representations of co-users that are connected to the user for display, the extended-reality communication system 106 can initiate communication with co-users that the user may want to speak to with reduced user interaction. Indeed, the extended-reality communication system 106 reduces the number of steps a user may be required to perform in order to communicate with a co-user (e.g., open a communication application, enter an extended reality arena designated for communication, approach the digital character of the desired co-user, and initiate communication with the contact).

Figure 5:
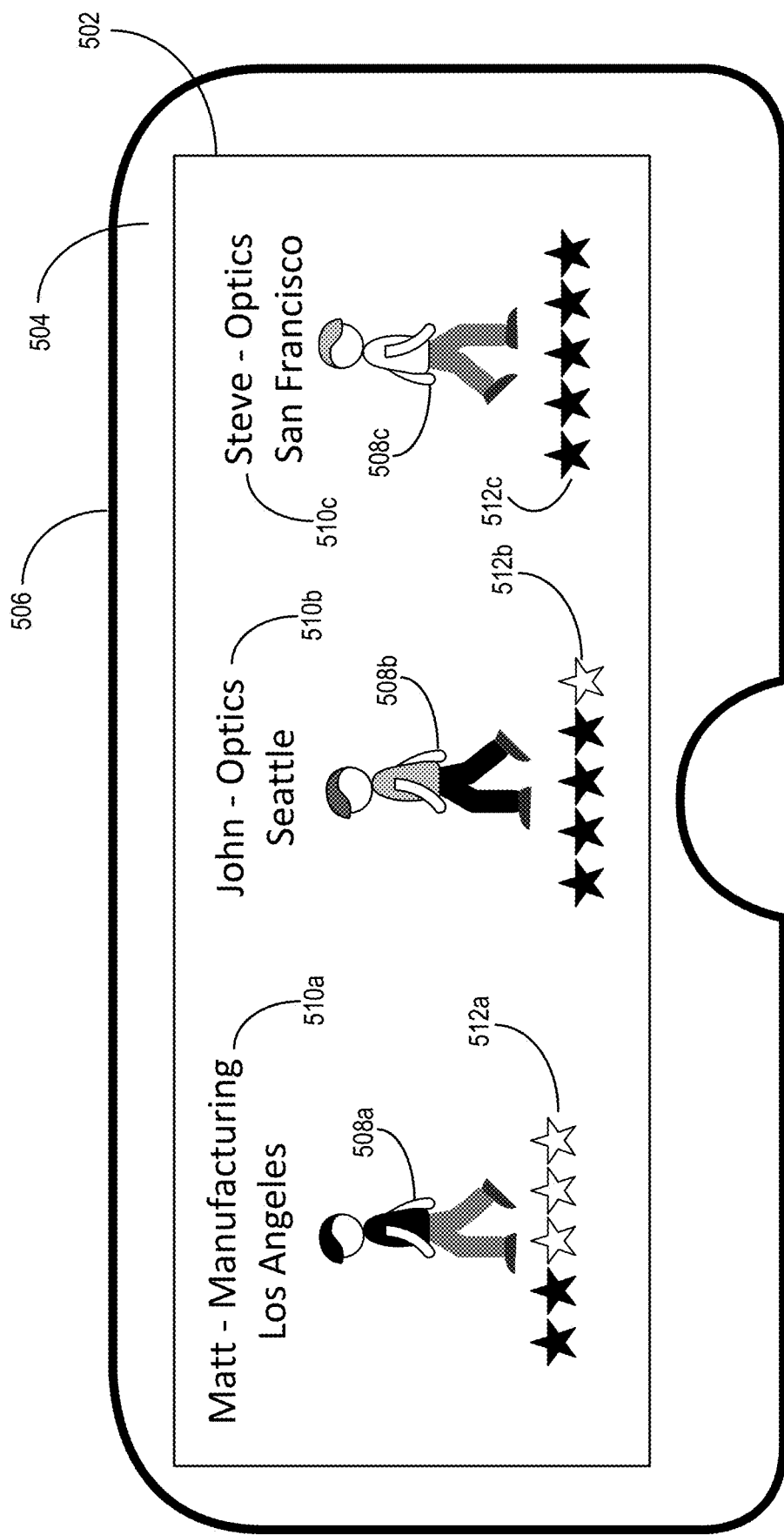
FIG. 5 illustrates a diagram for providing additional visual elements for display in accordance with one or more embodiments.

In one or more embodiments, the extended-reality communication system 106 provides additional visual elements for display—in association with the animated visual representations of co-users—in order to provide additional information to the user. FIG. 5 illustrates a diagram of the extended-reality communication system 106 providing additional visual elements for display in accordance with one or more embodiments.

As shown in FIG. 5, the extended-reality communication system 106 provides an extended-reality lobby window graphical user interface element 502 for display within an extended reality graphical user interface 504 displayed on an extended-reality device 506. Further, the extended-reality communication system 106 provides the animated visual representations 508a-508c of co-users for display within the extended-reality lobby window graphical user interface element 502.

As further shown in FIG. 5, the extended-reality communication system 106 provides visual elements 510a-510c (shown as text) for display in association with the animated visual representations 508a-508c representing a connection between the corresponding co-users and the user of the extended-reality device 506. The visual elements 510a-510c can include various pieces of information that indicate how a co-user is connected to the user. For example, as shown in FIG. 5, the visual elements 510a-510c can include the name of the co-user, the location of the co-user (e.g., city, state, country, etc.), and an indication of a task associated with the co-user. In some embodiments, the visual elements 510a-510c can include additional pieces of information, such as an organization and/or organizational component associated with the co-user.

Indeed, in some embodiments, the extended-reality communication system 106 determines connections between the user and co-users that are not physically located within the same location as the user and/or co-users with whom the user may not be familiar. Thus, the extended-reality communication system 106 can utilize the visual elements 510a-510c to indicate why the user may want to communicate with the corresponding co-users. To illustrate, the user may be part of an organization's optics team at a particular location and find value in communicating with members of the organization's optics teams at various other locations. Thus, the extended-reality communication system 106 can connect the user with co-users that can potentially help the user in a task and facilitate valuable communication with those co-users.

In one or more embodiments, the visual elements 510a-510c include icons, symbols, or other visual representations. For example, the extended-reality communication system 106 can maintain a set of icons for appropriate categories of information (e.g., location, task, organizational component, etc.). The extended-reality communication system 106 can provide one or more icons that represents a co-user for display in association with the corresponding animated visual representation.

Additionally, as shown in FIG. 5, the extended-reality communication system 106 provides visual elements 512a-512c for display in association with the animated visual representations 508a-508c representing a relevance rating associated with the corresponding co-users. Indeed, the extended-reality communication system 106 can determine a relevance rating that indicates a predicted value in communicating with the corresponding co-user or otherwise the strength of the connection between the user and the corresponding co-user. For example, in one or more embodiments, the extended-reality communication system 106 determines the relevance rating using a trained machine learning model to analyze the task profiles associated with the user and co-user. In some embodiments, the extended-reality communication system 106 utilizes a heuristic approach to determine a relevance rating (e.g., lower the rating for those co-users located within a different physical location than the user or increase the rating for those co-users who have been engaged in their respective task for a relatively long amount of time). Though FIG. 5 illustrates the visual elements 512a-512c as a star rating, the extended-reality communication system 106 can utilize various other visual elements that can convey a relevance rating (e.g., a color system, a percentage, etc.).

In one or more embodiments, in addition to or as an alternative to providing the visual elements 512a-512c to indicate the strength of the connection between the user and a co-user, the extended-reality communication system 106 provides other visual cues. For example, the extended-reality communication system 106 can provide the animated visual representation corresponding to a co-user for display within the extended-reality lobby window graphical user interface element 502 with a frequency based on the strength of the connection between the user and the co-user. To illustrate, the extended-reality communication system 106 can provide an animated visual representation for display with relatively high frequency where the corresponding co-user has a relatively strong connection to the user. Likewise, the extended-reality communication system 106 can provide the animated visual representation for display with relatively low frequency where the corresponding co-user has a relatively weak connection to the user. Accordingly, the extended-reality communication system 106 can ensure that a co-user that is strongly connected to a user passes by the extended-reality lobby window graphical user interface element 502 displayed to the user more often, facilitating a greater chance of communication between the user and the co-user.

Figure 6:
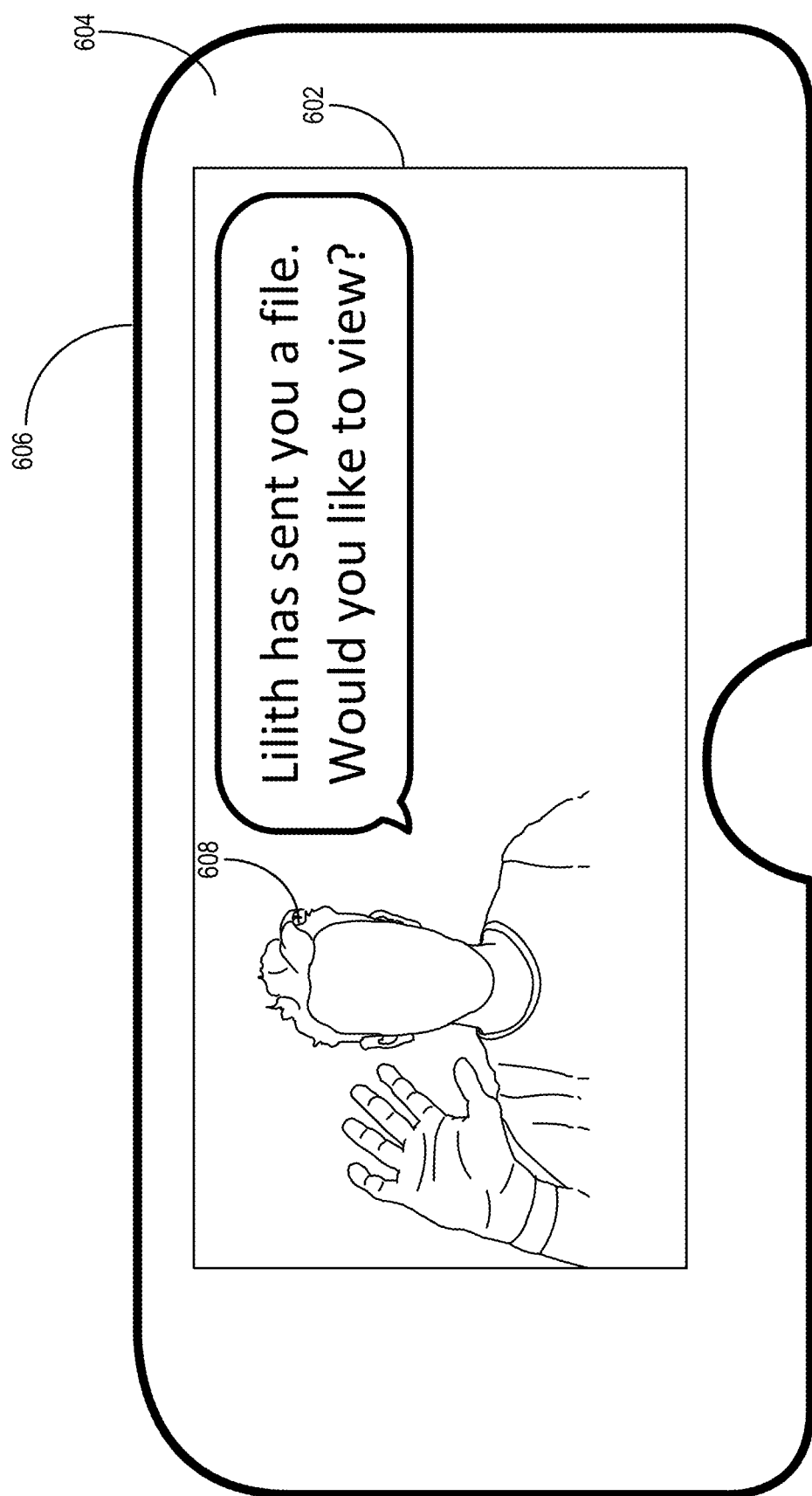
FIG. 6 illustrates a diagram for providing a visual element corresponding to a digital object for display in accordance with one or more embodiments.

As mentioned above, the extended-reality communication system 106 can provide an option for a user to send a digital object to a co-user. Accordingly, the extended-reality communication system 106 can provide a visual element corresponding to a digital object (e.g., a digital file) received for a user for display on an extended-reality device of the user. FIG. 6 illustrates a diagram of the extended-reality communication system 106 providing a visual element corresponding to a digital object for display in accordance with one or more embodiments.

As shown in FIG. 6, the extended-reality communication system 106 provides an extended-reality lobby window graphical user interface element 602 for display within an extended reality graphical user interface 604 displayed on an extended-reality device 606. Further, the extended-reality communication system 106 provides the visual element 608 corresponding to a digital object within the extended-reality lobby window graphical user interface element 602. As shown in FIG. 6, the visual element 608 includes an animated digital character communicating to the user that the user has been sent a file. In some embodiments, however, the visual element includes visual representations of the digital object, such as a visual representation of the digital object itself (e.g., a virtual sheet of paper representing a document) or an inbox or shelf that appears to become fuller when a digital object is sent to the user. In some embodiments, the visual element includes an extended-reality object (e.g., a virtual object) that can be displayed and/or utilized within an extended-reality environment.

In one or more embodiments, the extended-reality communication system 106 provides access to the digital object in response to detecting a user interaction with the visual element 608 or some other user input targeting the visual element 608. In some embodiments, however, the extended-reality communication system 106 provides a separate visual element for display within the extended reality graphical user interface 604 to enable access to the digital object.

Figure 7:
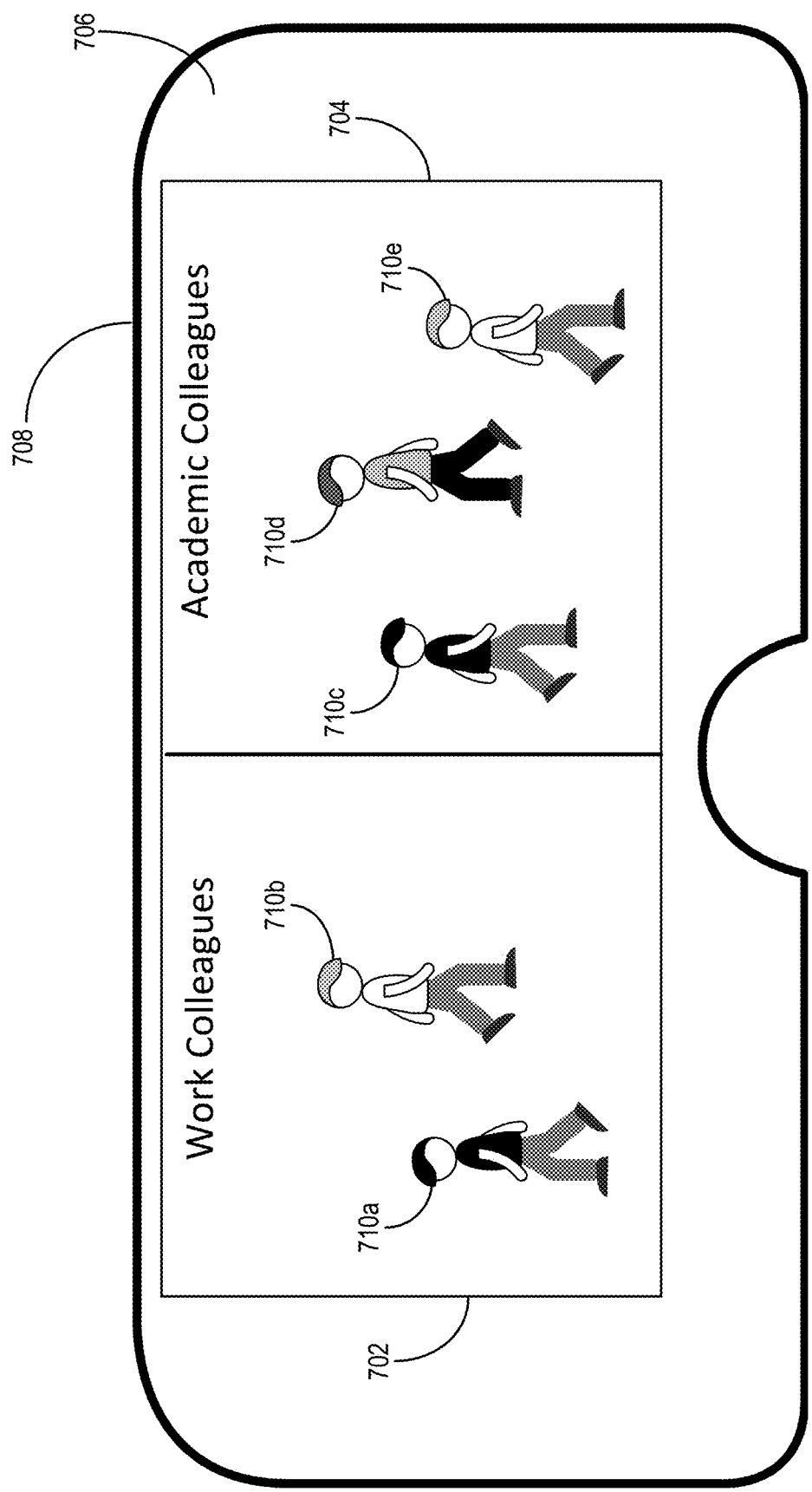
FIG. 7 illustrates a diagram for providing multiple extended-reality lobby window graphical user interface elements object for display in accordance with one or more embodiments.

In one or more embodiments, the extended-reality communication system 106 can provide multiple extended-reality lobby window graphical user interface elements for display. FIG. 7 illustrates a diagram of the extended-reality communication system 106 providing multiple extended-reality lobby window graphical user interface elements object for display in accordance with one or more embodiments.

As shown in FIG. 7, the extended-reality communication system 106 provides a first extended-reality lobby window graphical user interface element 702 and a second extended-reality lobby window graphical user interface element 704 for display within an extended reality graphical user interface 706 displayed on an extended-reality device 708. In some instances, the extended-reality communication system 106 provides multiple extended-reality lobby window graphical user interface elements to visually separate multiple networking circles associated with the user of the extended-reality device 708.

For example, as shown in FIG. 7, the first extended-reality lobby window graphical user interface element 702 can correspond to an employment associated with the user. Thus, the extended-reality communication system 106 can provide animated visual representations 710a-710b for display within the first extended-reality lobby window graphical user interface element 702 that correspond to work colleagues (e.g., supervisors, subordinates, team members, etc.). Similarly, the second extended-reality lobby window graphical user interface element 704 can correspond to one or more academic circles associated with the user. Thus, the extended-reality communication system 106 can provide animated visual representations 710c-710e that correspond to academic colleagues (e.g., professors or researchers that are part of a different organization than the user but study, research, or teach academic topics that correspond to a task associated with the user). By using the multiple extended-reality lobby window graphical user interface elements, the extended-reality communication system 106 can inform the user of the different types of connections represented by the animated visual representations 710a-710e.

Though the above discussion suggests that the extended-reality communication system 106 operates with respect to co-users having employment-related connections to the user, it should be understood that the extended-reality communication system 106 is not so limited. For example, in one or more embodiments, the extended-reality communication system 106 can identify co-users with whom the user is connected to socially. Indeed, the extended-reality communication system 106 can determine a social connection between a user and a co-user (e.g., through a familial relationship, based on a proximity of their respective hometowns, based on the schools they attended, based on direct or indirect connections through social media, etc.) and provide an animated visual representation of the co-user for display on an extended-reality device of the user.

In one or more embodiments, the extended-reality communication system 106 generates a customized dynamic page, dashboard, or sidebar for display to a user via the extended-reality device of the user (or another computing device associated with the user). For example, the extended-reality communication system 106 can generate the dynamic page, dashboard, or sidebar based on the task profile of the user, the determined connections between the user and co-users, and/or the communities to which the user has been added. The extended-reality communication system 106 can further provide, for display within the dynamic page, dashboard or sidebar, visual elements corresponding to the communities or workgroups of which the user is a member, other members of those communities or workgroups, or other items (e.g., documents, webpages, news items, a chat interface, a resources library, etc.) that may be relevant to a task with which the user is engaged. The extended-reality communication system 106 can update the dynamic page, dashboard, or sidebar as the user changes tasks, communities, workgroups, etc.

Figure 8:
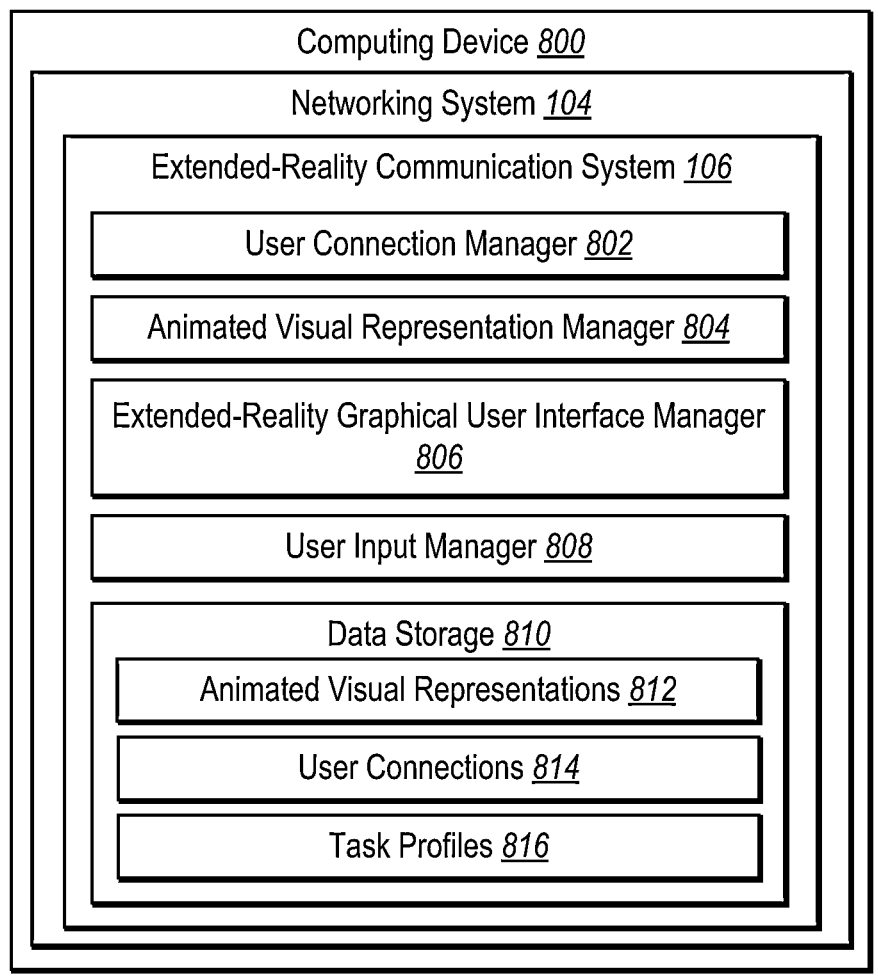
FIG. 8 illustrates an example schematic diagram of an extended-reality communication system in accordance with one or more embodiments.

Turning now to FIG. 8, additional detail will now be provided regarding various components and capabilities of the extended-reality communication system 106. In particular, FIG. 8 illustrates the extended-reality communication system 106 implemented by the computing device 800 (e.g., the server(s) 102 and/or one of the client devices 112a-112n as discussed above with reference to FIG. 1). Additionally, the extended-reality communication system 106 is also part of the networking system 104. As shown, the extended-reality communication system 106 can include, but is not limited to, a user connection manager 802, an animated visual representation manager 804, an extended reality graphical user interface manager 806, a user input manager 808, and data storage 810 (which includes animated visual representations 812, user connections 814, and task profiles 816).

As just mentioned, and as illustrated in FIG. 8, the extended-reality communication system 106 includes the user connection manager 802. In particular, the user connection manager 802 can determine connections between a user of a networking system and one or more co-users of the networking system. For example, the user connection manager 802 can determine a connection based on a task associated with the user and a task associated with the co-user, recent communications between the user and the co-user, and/or an organizational structure corresponding to an organization associated with the user and the co-user.

Further, as shown in FIG. 8, the extended-reality communication system 106 includes the animated visual representation manager 804. In particular, the animated visual representation manager 804 can identify one or more animated visual representations to be displayed on an extended-reality device. For example, the animated visual representation manager 804 can identify animated visual representations that correspond to co-users determined to have a connection with the user by the user connection manager 802.

As shown in FIG. 8, the extended-reality communication system 106 further includes the extended reality graphical user interface manager 806. In particular, the extended reality graphical user interface manager 806 provides visual elements for display within an extended reality graphical user interface displayed on an extended-reality device. For example, the extended reality graphical user interface manager 806 can provide one or more extended-reality lobby window graphical user interface elements. Further, the extended reality graphical user interface manager 806 can provide one or more animated visual representations selected by the animated visual representation manager 804 for display within the extended-reality lobby window graphical user interface element(s).

Additionally, as shown in FIG. 8, the extended-reality communication system 106 includes the user input manager 808. In particular, the user input manager 808 can receive or otherwise detect user input. For example, the user input manager 808 can receive voice input, touch input, eye tracking input, or input via a controller device associated with the extended-reality communication system 106. In some instances, the user input manager 808 communicates the received user input with the extended reality graphical user interface manager 806 so that the extended reality graphical user interface manager 806 can change the visual elements provided for display on the extended-reality device.

As further shown in FIG. 8, the extended-reality communication system 106 includes data storage 810. In particular, data storage 810 includes animated visual representations 812, user connections 814, and task profiles 816. Animated visual representations 812 can store the animated visual representations that correspond to the users of the networking system 104. Animated visual representations 812 can provide access to the animated visual representations for selection by the animated visual representation manager 804. User connections 814 can store connections determined between users of the networking system 104 by the user connection manager 802. Task profiles 816 can store task profiles generated for the users of the networking system 104. The user connection manager 802 can utilize the stored task profiles to determine connections between users in some instances. Though not shown, data storage 810 can store various other forms of digital data. For example, data storage 810 can store digital objects or messages that are passed from one user of a networking system to a co-user of the networking system.

Each of the components 802-816 of the extended-reality communication system 106 can include software, hardware, or both. For example, the components 802-816 can include one or more instructions stored on a computer-readable storage medium and executable by processors of one or more computing devices, such as a client device or server device. When executed by the one or more processors, the computer-executable instructions of the extended-reality communication system 106 can cause the computing device(s) to perform the methods described herein. Alternatively, the components 802-816 can include hardware, such as a special-purpose processing device to perform a certain function or group of functions. Alternatively, the components 802-816 of the extended-reality communication system 106 can include a combination of computer-executable instructions and hardware.

Furthermore, the components 802-816 of the extended-reality communication system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-816 of the extended-reality communication system 106 may be implemented as a stand-alone application, such as a desktop or mobile application. Furthermore, the components 802-816 of the extended-reality communication system 106 may be implemented as one or more web-based applications hosted on a remote server. Alternatively, or additionally, the components 802-816 of the extended-reality communication system 106 may be implemented in a suite of mobile device applications or "apps."

Figure 9:
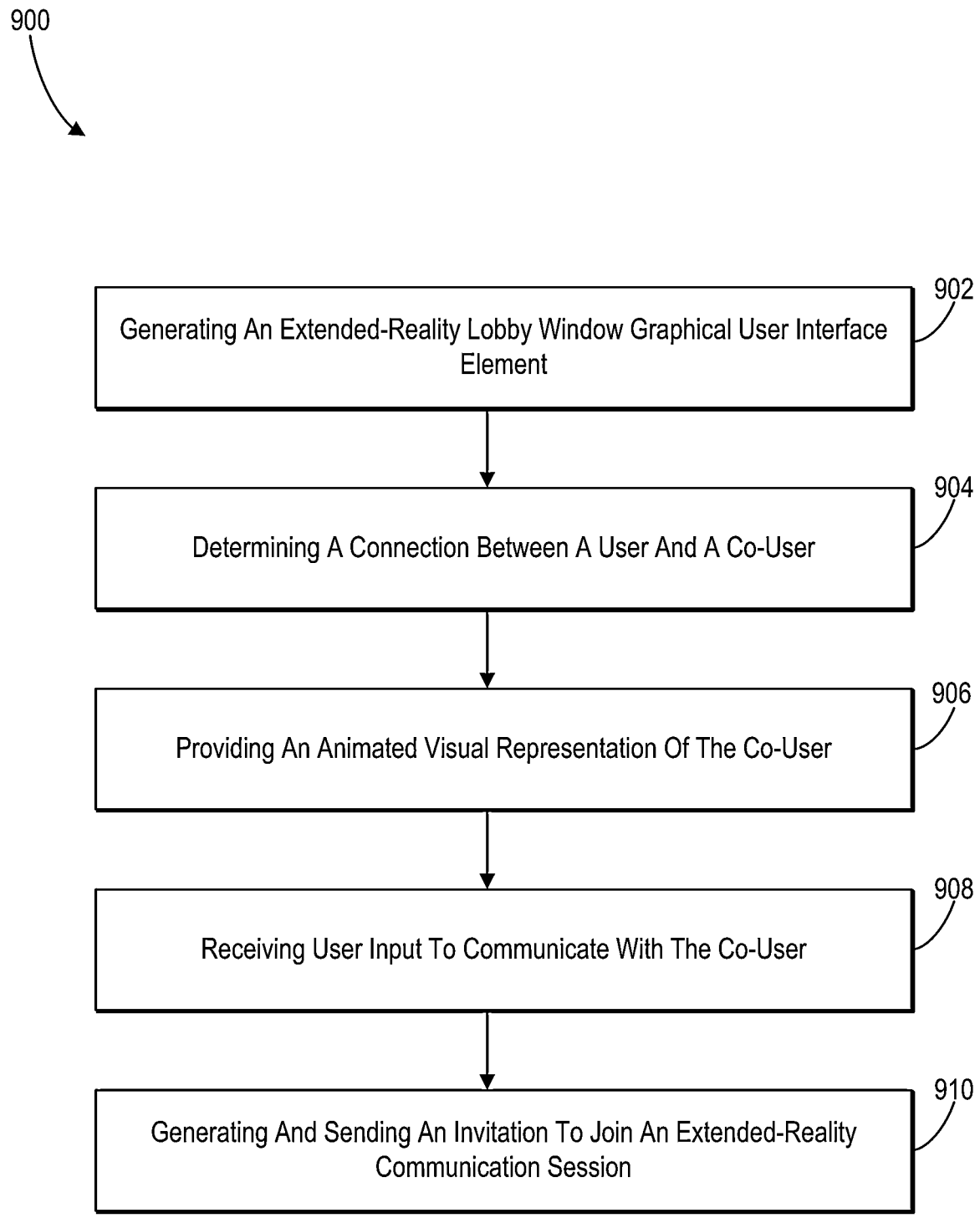
FIG. 9 illustrates a flowchart of a series of acts for initiating an extended-reality communication session in accordance with one or more embodiments.

FIGS. 1-8, the corresponding text and the examples provided a number of different methods, systems, devices, and non-transitory computer-readable media of the extended-reality communication system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

As mentioned, FIG. 9 illustrates a flowchart of a series of acts 900 for initiating an extended-reality communication session in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can store instructions thereon that, when executed by at least one processor, cause a computing device to perform the acts of FIG. 9. In some embodiments, a system can perform the acts of FIG. 9. For example, in one or more embodiments, a system includes at least one processor. The system can further include at least one non-transitory computer-readable medium comprising instructions that, when executed by the at least one processor, cause the system to perform the acts of FIG. 9.

The series of acts 900 includes an act 902 of generating an extended-reality lobby window graphical user interface element. For example, the act 902 can involve generating, for display on a first extended-reality device corresponding to a user of a networking system, an extended-reality lobby window graphical user interface element. In one or more embodiments, the extended-reality lobby window graphical user interface element provides a view into an extended-reality lobby.

The series of acts 900 also includes an act 904 of determining a connection between a user and a co-user. For example, the act 904 can involve determining a connection between the user of the networking system and a co-user of the networking system.

In one or more embodiments, determining the connection between the user and the co-user comprises identifying an organizational structure corresponding to an organization associated with the user; and identifying the co-user from one or more co-users of the networking system connected to the user based on the organizational structure.

In some embodiments, the extended-reality communication system 106 generates a task profile associated with the user based on one or more digital activities executed by the user (including physical activities that are digitally detected); and adds the user to a community of the networking system based on a similarity between the task profile of the user and one or more task profiles associated with one or more co-users of the community. Accordingly, the extended-reality communication system 106 can determine the connection between the user and the co-user by identifying the co-user from the one or more co-users of the community.

Further, the series of acts 900 includes an act 906 of providing an animated visual representation of the co-user. For example, the act 906 can involve providing, for display within the extended-reality lobby window graphical user interface element displayed on the first extended-reality device, an animated visual representation of the co-user based on the connection between the user and the co-user. In some instances, the extended-reality communication system 106 further provides, for display within the extended-reality lobby window graphical user interface element displayed on the first extended-reality device and in association with the animated visual representation of the co-user, a visual element representing the connection between the user and the co-user.

In some embodiments, the extended-reality communication system 106 further determines an availability status of the co-user. Accordingly, providing the animated visual representation of the co-user based on the connection between the user and the co-user, can include providing the animated visual representation of the co-user further based on the availability status of the co-user.

In some embodiments, the extended-reality communication system 106 provides the animated visual representation of the co-user for display within the extended-reality lobby window graphical user interface element by providing the animated visual representation of the co-user traversing the extended-reality lobby for display within the extended-reality lobby window graphical user interface element. In some instances, providing the animated visual representation of the co-user traversing the extended-reality lobby for display within the extended-reality lobby window graphical user interface element comprises providing a plurality of instances of the animated visual representation of the co-user traversing the extended-reality lobby using a frequency based on the connection between the user and the co-user.

Additionally, the series of acts 900 includes an act 908 of receiving user input to communicate with the co-user. For example, the act 908 can involve receiving user input targeting the animated visual representation of the co-user to communicate with the co-user. In one or more embodiments, receiving the user input targeting the animated visual representation of the co-user to communicate with the co-user comprises receiving a voice input comprising a name of the co-user.

In some embodiments, the user input targets the animated visual representation of the co-user from among additional animated visual representations of additional co-users. To illustrate, the extended-reality communication system 106 can determine additional connections between the user of the networking system and additional co-users of the networking system; and provide, for display within the extended-reality lobby window graphical user interface element displayed on the first extended-reality device with the animated visual representation of the co-user, a plurality of additional animated visual representations of the additional co-users based on the additional connections. Accordingly, in response to receiving the user input targeting the animated visual representation of the co-user, the extended-reality communication system 106 can remove the additional animated visual representations of the additional co-users from the extended-reality lobby window graphical user interface element displayed on the first extended-reality device.

The series of acts 900 further includes an act 910 of generating and sending an invitation to join an extended-reality communication session. For example, the act 910 can involve generating and sending, for display on a second extended-reality device corresponding to the co-user, an invitation to join an extended-reality communication session in response to receiving the user input.

In one or more embodiments, the extended-reality communication system 106 provides the animated visual representation of the co-user for display within the extended-reality lobby window graphical user interface element displayed on the first extended-reality device to communicate a first option to send a message to the co-user and a second option to speak with the co-user; and receives a user selection of the second option to speak with the co-user. Accordingly, the extended-reality communication system 106 can generate and send the invitation to join the extended-reality communication session in response to the user selection of the second option.

In one or more embodiments, sending the invitation to join the extended-reality communication session comprises providing, for display within an additional extended-reality lobby window graphical user interface element displayed on the second extended-reality device, an animated visual representation of the user to communicate the invitation.

In some instances, the series of acts 900 further includes acts for conducting an extended-reality communication session between the first extended-reality device and the second extended-reality device. For example, in one or more embodiments, the acts include receiving, from the second extended-reality device corresponding to the co-user, an acceptance of the invitation to join the extended-reality communication session; and in response to receiving the acceptance, conducting the extended-reality communication session between the first extended-reality device and the second extended-reality device by: providing the animated visual representation of the co-user for display within the extended-reality lobby window graphical user interface element displayed on the first extended-reality device to communicate voice input received from the second extended-reality device corresponding to the co-user; and providing an animated visual representation of the user for display within an additional extended-reality lobby window graphical user interface element displayed on the second extended-reality device to communicate additional voice input received from the first extended-reality device corresponding to the user.

In some embodiments, the series of acts 900 further includes acts for notifying the user of a digital object sent by a co-user. For example, in one or more embodiments, the acts include receiving, from a third extended-reality device corresponding to an additional co-user of the networking system, a digital object for the user; and providing, for display within the extended-reality lobby window graphical user interface element displayed on the first extended-reality device, a visual element corresponding to the digital object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As indicated above, embodiments of the invention may include or be implemented in conjunction with an extended reality system. Extended reality is a form of reality that has been adjusted in some manner before presentation to a user, which may include, e.g., a virtual reality (VR), an augmented reality (AR), a mixed reality (MR), a hybrid reality, or some combination and/or derivatives thereof. Extended reality content may include completely generated content or generated content combined with captured content (e.g., real-world photographs). The extended reality content may include video, audio, haptic feedback, or some combination thereof, and any of which may be presented in a single channel or in multiple channels (such as stereo video that produces a three-dimensional effect to the viewer). Additionally, in some embodiments, extended reality may be associated with applications, products, accessories, services, or some combination thereof, that are, e.g., used to create content in an extended reality and/or used in (e.g., perform activities in) an extended reality. The extended reality system that provides the extended reality content may be implemented on various platforms, including a head-mounted display (HMD) connected to a host computer system, a standalone HMD, a mobile device or computing system, or any other hardware platform capable of providing extended reality content to one or more viewers.

Figure 10:
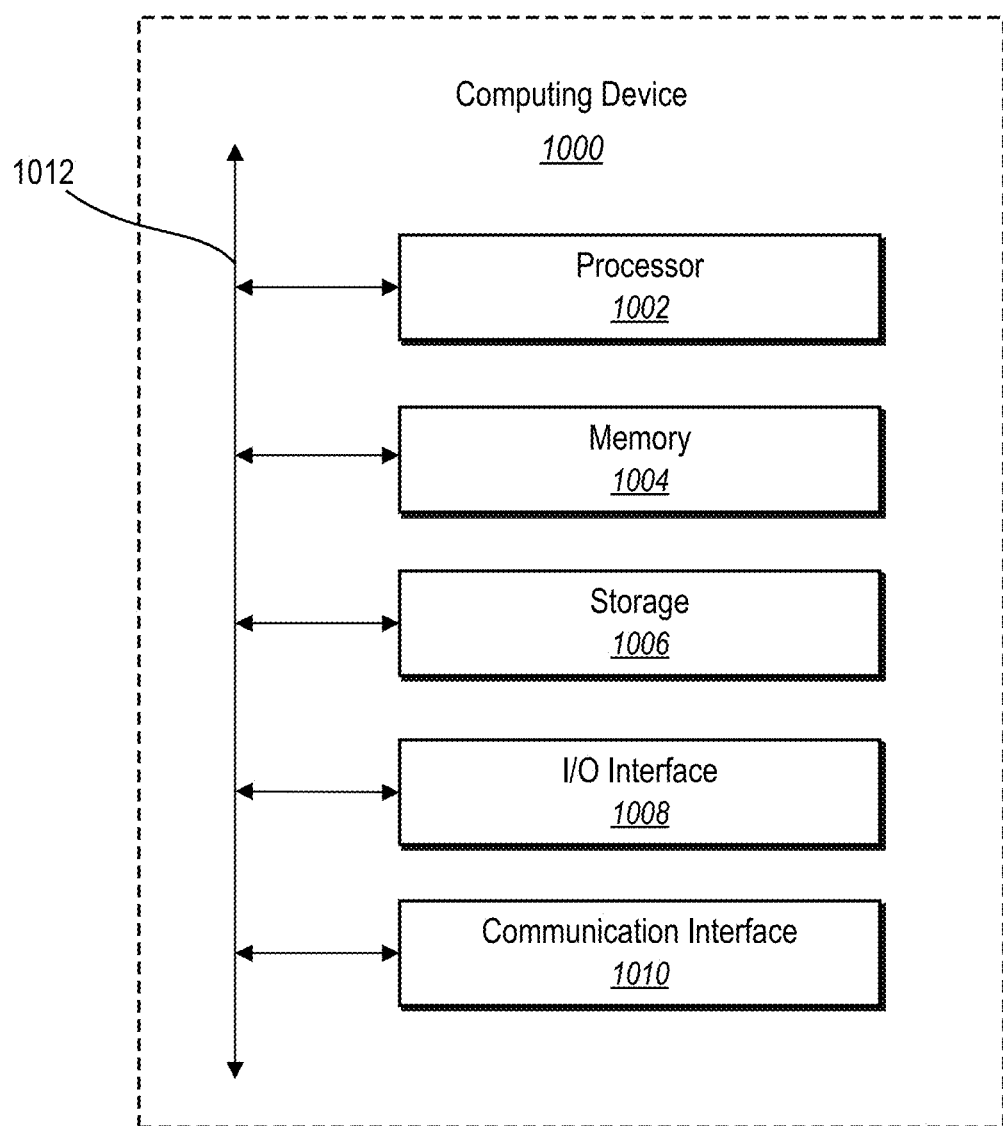
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the computing device 800, the server(s) 102, the third-party server 110, and/or the client devices 112a-112n). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

As mentioned above, the communications system can be included in a networking system, such as a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 11:
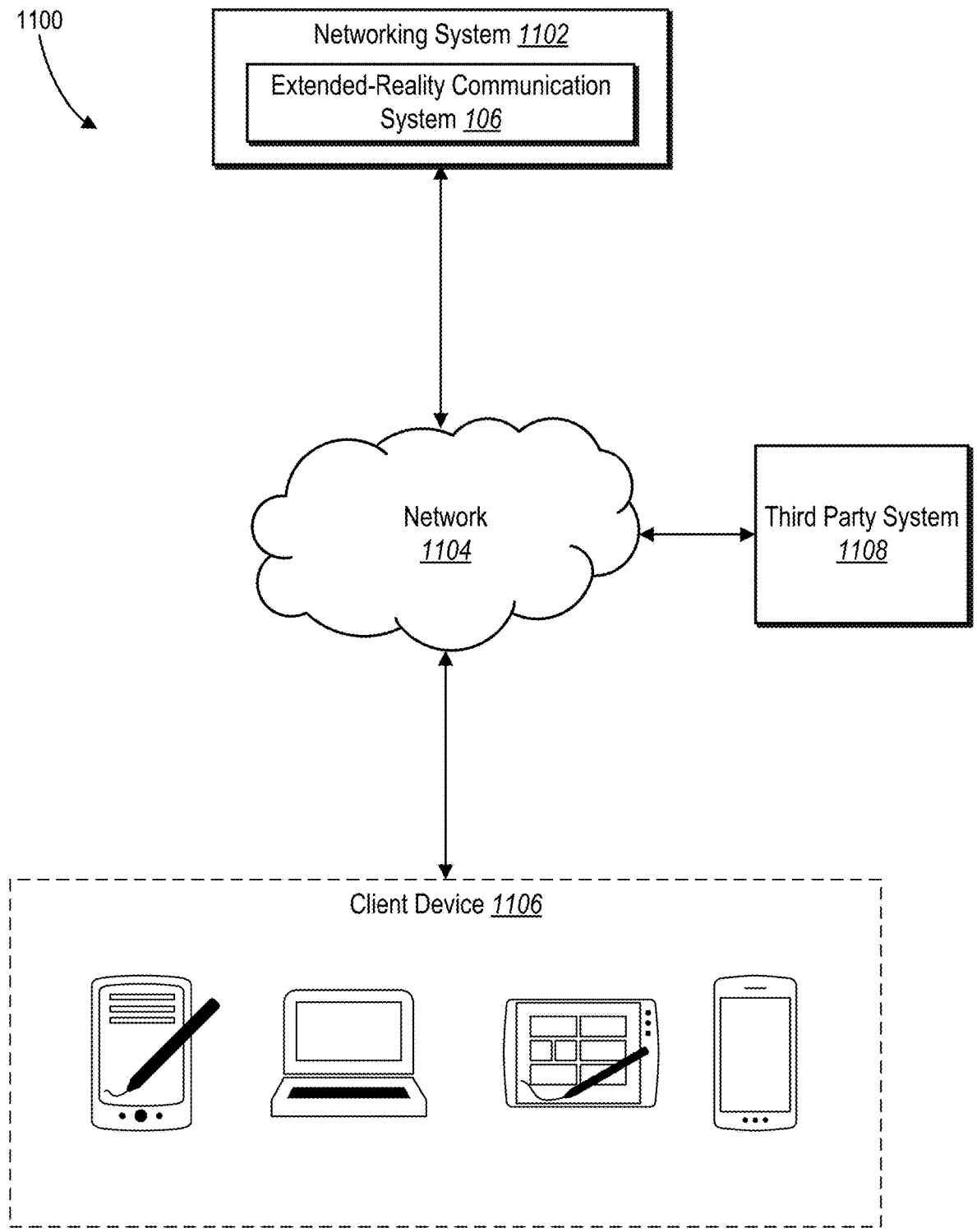
FIG. 11 illustrates a network environment of a social networking system according to one or more embodiments.

FIG. 11 illustrates an example network environment 1100 of a social networking system. The network environment 1100 includes a client device 1106, a social networking system 1102, and a third-party system 1108 connected to each other by a network 1104. Although FIG. 11 illustrates a particular arrangement of client device 1106, the social networking system 1102, the third-party system 1108, and the network 1104, this disclosure contemplates any suitable arrangement and number of client device 1106, the social networking system 1102, the third-party system 1108, and the network 1104.

Links may connect the client device 1106, the social networking system 1102, and the third-party system 1108 to the network 1104 or to each other. Links need not necessarily be the same throughout network environment 1100. One or more first links may differ in one or more respects from one or more second links.

In some embodiments, the client device 1106 may be an electronic device including hardware, software, or embedded logic components or a combination of two or more such components and capable of carrying out the appropriate functionalities implemented or supported by the client device 1106. As an example, a client device 1106 may include any of the computing devices discussed above in relation to FIG. 10. The client device 1106 may enable a network user at the client device 1106 to access the network 1104. The client device 1106 may enable its user to communicate with other users at other client devices or systems.

In some embodiments, the client device 1106 may include a web browser, such as and may have one or more add-ons, plug-ins, or other extensions. The client device 1106 may render a web page based on the HTML files from the server for presentation to the user.

In some embodiments, the social networking system 1102 may be a network-addressable computing system that can host an online social network. In addition, the social networking system 1102 may generate, store, receive, and send social-networking data, such as, for example, user-profile data, concept-profile data, the social-graph information, or other suitable data related to the online social network. The social networking system 1102 may be accessed by the other components of the network environment 1100 either directly or via the network 1104.

As shown, the social networking system 1102 includes the networking system 104, which is described above. The networking system 104 may be implemented on a unitary server or a distributed server spanning multiple computers or multiple datacenters. These servers may be of various types, such as, for example and without limitation, web server, news server, mail server, message server, advertising server, file server, application server, exchange server, database server, proxy server, etc., or any combination thereof.

In some embodiments, the social networking system 1102 may include one or more data stores. Data stores may be used to store various types of information. In some embodiments, the information stored in data stores may be organized according to specific data structures. Particular embodiments may provide interfaces that enable the client device 1106, the social networking system 1102, or the third-party system 1108 to manage, retrieve, modify, add, or delete, the information stored in data stores.

In some embodiments, the social networking system 1102 may store one or more social graph, described below. In one or more embodiments, the social networking system 1102 may provide users with the ability to take actions on various types of items or objects, supported by social networking system 1102. As an example, the items and objects may include groups or social networks to which users of the social networking system 1102 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 1102 or by an external system of the third-party system 1108, which is separate from the social networking system 1102 and coupled to the social networking system 1102 via the network 1104.

The social networking system 1102 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external).

An action-logging manager may be used to receive communications from a web server about a user's actions on or off the social networking system 1102. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 1102. A privacy setting of a user determines how particular information associated with a user can be shared. The authorization server may allow users to opt in to or opt out of having their actions logged by the social networking system 1102 or shared with other systems (e.g., the third-party system 1108), such as, for example, by setting appropriate privacy settings.

In some embodiments, the third-party system 1108 may include one or more types of servers, one or more data stores, one or more interfaces, including but not limited to APIs, one or more web services, one or more content sources, one or more networks, or any other suitable components. The third-party system 1108 may be operated by a different entity from an entity operating the social networking system 1102 even if, in some embodiments, the social networking system 1102 and the third-party systems 1108 operate in conjunction with each other. In this sense, the social networking system 1102 may provide a platform, or backbone, which other systems, such as the third-party systems 1108, may use to provide social-networking services and functionality to users across the Internet.

In some embodiments, a third-party system 1108 may include a third-party content object provider. A third-party content object provider may include one or more sources of content objects, which may be communicated to the client device 1106. As an example, content objects may include information regarding things or activities of interest to the user. As another example, content objects may include incentive content objects.

Figure 12:
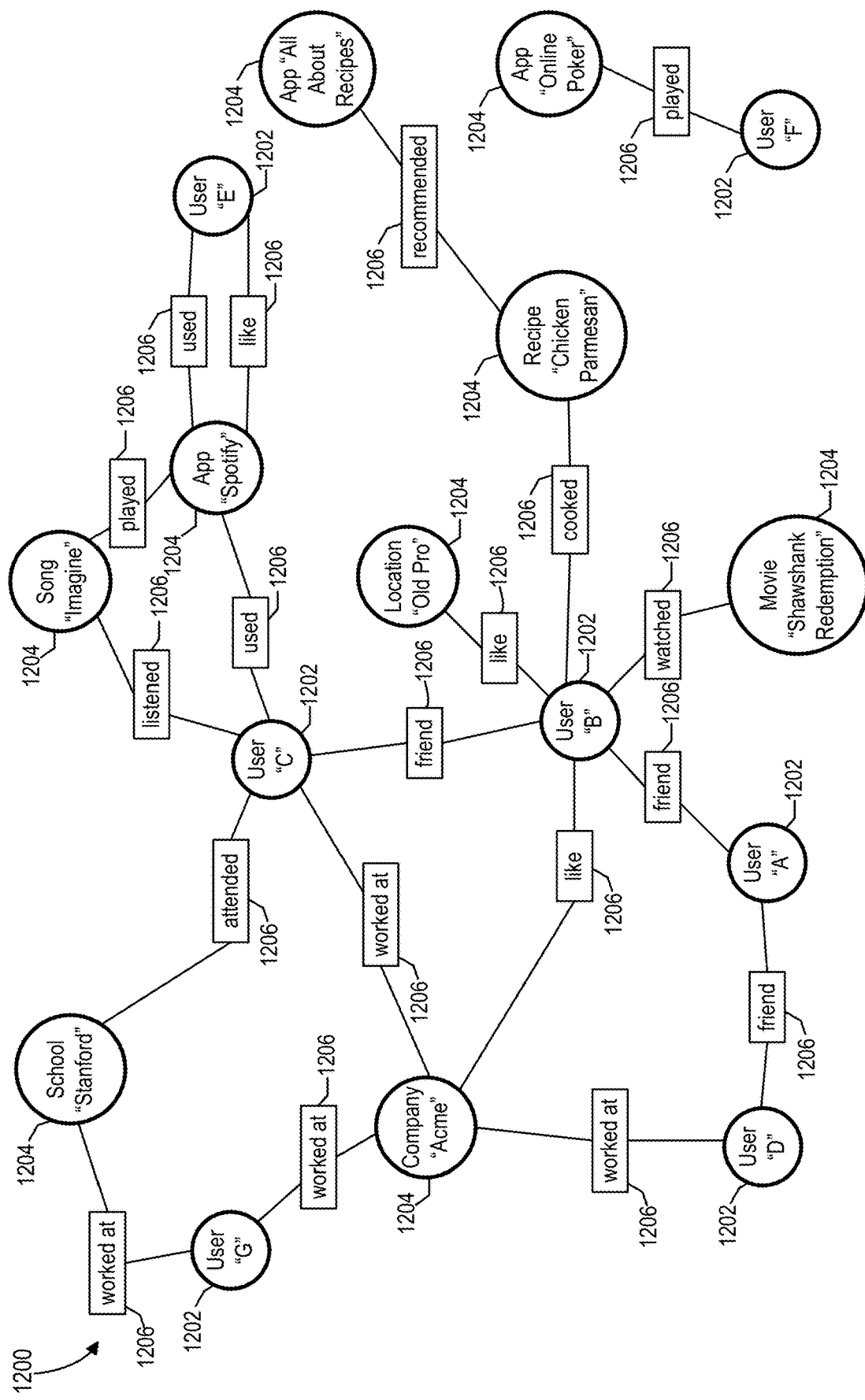
FIG. 12 illustrates an example social graph for a social networking system in accordance with one or more embodiments.

FIG. 12 illustrates an example social graph 1200. In some embodiments, the social networking system 1102 may store one or more social graphs 1200 in one or more data stores. In some embodiments, the social graph 1200 may include multiple nodes—which may include multiple user nodes or multiple concept nodes—and multiple edges 1206 connecting the nodes. The social graph 1200 illustrated in FIG. 12 is shown, for didactic purposes, in a two-dimensional visual map representation.

In some embodiments, a user node 1202 may correspond to a user of social networking system 1102. When a user registers for an account with social networking system 1102, the social networking system 1102 may create a user node 1202 corresponding to the user and store the user node 1202 in one or more data stores. Users and user nodes described herein may, where appropriate, refer to registered users and user nodes associated with registered users.

In some embodiments, a concept node 1204 may correspond to a concept. As an example, a concept may correspond to a place, a website, an entity, a resource, etc. A concept may be located within social networking system 1102 or on an external server. A concept node 1204 may be associated with information of a concept provided by a user or information gathered by various systems, including the social networking system 1102.

In some embodiments, a node in social graph 1200 may represent or be represented by an online profile page. Profile pages may be hosted by or accessible to social networking system 1102. Profile pages may be viewable by all or a selected subset of other users. As an example, a user node 1202 may have a corresponding user-profile page where the corresponding user may add content, make declarations, or otherwise express him or herself. As another example, a concept node 1204 may have a corresponding concept-profile page in which one or more users may add content, make declarations, or express themselves, particularly in relation to the concept corresponding to concept node 1204.

As an example, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships.

In some embodiments, a pair of nodes in social graph 1200 may be connected to each other by one or more edges 1206. An edge 1206 connecting a pair of nodes may represent a relationship between the pair of nodes. In some embodiments, an edge 1206 may include or represent one or more data objects or attributes corresponding to the relationship between a pair of nodes. As an example, a first user may indicate that a second user is a "friend" of the first user. In response to this indication, the social networking system 1102 may send a "friend request" to the second user. If the second user confirms the "friend request," the social networking system 1102 may create an edge 1206 connecting the first user's user node 1202 to the second user's user node 1202 in social graph 1200 and store edge 1206 as social-graph information in one or more of data stores.

In some embodiments, an edge 1206 between a user node 1202 and a concept node 1204 may represent a particular action or activity performed by a user associated the with the user node 1202 toward a concept associated with the concept node 1204. As an example, as illustrated in FIG. 12, a user may "like," "attended," "played," "listened," "cooked," "worked at," or "watched" a concept, each of which may correspond to an edge type or subtype.

In some embodiments, the social networking system 1102, the client device 1106, or the third-party system 1108 may access the social graph 1200 and related social-graph information for suitable applications. The nodes and edges of social graph 1200 may be stored as data objects, for example, in a data store (such as a social-graph database). Such a data store may include one or more searchable or query-able indexes of nodes or edges of social graph 1200.

In some embodiments, an advertisement may be text (which may be HTML-linked), one or more images (which may be HTML-linked), one or more videos, audio, a suitable combination of these, or any other suitable advertisement in any suitable digital format presented on one or more web pages, in one or more e-mails, or in connection with search results requested by a user. In addition, or as an alternative, an advertisement may be one or more sponsored stories (e.g., a news feed or ticker item on the social networking system 1102).

An advertisement may also include social networking system functionality with which a user may interact. As an example, an advertisement may enable a user to "like" or otherwise endorse the advertisement by selecting an icon or link associated with an endorsement. In addition, or as an alternative, an advertisement may include social networking system context directed to the user. As an example, an advertisement may display information about a friend of the user within social networking system 1102 who has taken an action associated with the subject matter of the advertisement.

In some embodiments, the social networking system 1102 may determine the social-graph affinity (herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity.

In some embodiments, the social networking system 1102 may measure or quantify social-graph affinity using an affinity coefficient (herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 1102 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 1102 may determine coefficients using machine-learning algorithms trained on historical actions and past user responses, or data farmed from users by exposing them to various options and measuring responses.

In some embodiments, the social networking system 1102 may calculate a coefficient based on a user's actions. The social networking system 1102 may monitor such actions on the online social network, on the third-party system 1108, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 1102 may calculate a coefficient based on the user's actions with particular types of content. The content may be associated with the online social network, the third-party system 1108, or another suitable system. The social networking system 1102 may analyze a user's actions to determine whether one or more of the actions indicate an affinity for subject matter, content, other users, and so forth.

In some embodiments, the social networking system 1102 may calculate a coefficient based on the type of relationship between particular objects. Referencing the social graph 1200, the social networking system 1102 may analyze the number and/or type of edges 1206 connecting particular user nodes and concept nodes 1204 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 1200.

In some embodiments, the social networking system 1102 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1106 of the user). A first user may be more interested in other users or concepts that are closer to the first user. As an example, if a user is one mile from an airport and two miles from a gas station, the social networking system 1102 may determine that the user has a higher coefficient for the airport than the gas station based on the proximity of the airport to the user.

In some embodiments, the social networking system 1102 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 1102 may provide information that is relevant to user's interests and current circumstances, increasing the likelihood that they will find such information of interest.

In some embodiments, the social networking system 1102 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 11/503,093, filed Aug. 10, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 1102 may send a request to the data store for the object. The request may identify the user associated with the request and may be sent to the user (or the client device 1106 of the user) if the authorization server determines that the user is authorized to access the object based on the privacy settings associated with the object, but not otherwise.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating, for display on a first extended-reality device corresponding to a first user of a networking system, a graphical user interface element providing a view into an extended-reality room that comprises a digital three-dimensional space having one or more animated visual representations of one or more respective co-users of the networking system, wherein the one or more respective co-users are associated with the first user, and wherein one or more of the animated visual representations of the one or more respective co-users were generated without input from a respective co-user, of the one or more respective co-users, for viewing through the interface by the first user;
receiving, from the first user, input targeting one of the animated visual representations of a co-user, corresponding to the targeted one of the animated visual representations, in the digital three-dimensional space of the extended-reality room; and
generating and sending, for display on a second extended-reality device corresponding to the co-user, corresponding to the targeted one of the animated visual representations, an invitation to join an extended reality communication session in response to receiving the input.

2. The method of claim 1, wherein generating the graphical user interface element providing the view into the extended-reality room comprises generating an extended-reality lobby window graphical user interface element.

3. The method of claim 1, wherein each of the one or more of the animated visual representations of the one or more respective co-users of the networking system comprises an avatar.

4. The method of claim 3, further causing each avatar to traverse the digital three-dimensional space at a frequency.

5. The method of claim 4, further comprising:
determining a strength of connection between the first user and a particular one of the co-users; and
causing an avatar of the particular one of the co-users to traverse the digital three-dimensional space at a frequency based on the strength of connection between the first user and the particular one of the co-users.

6. The method of claim 5, wherein determining the strength of connection between the first user and the particular one of the co-users comprises:
Identifying an organizational structure corresponding to an organization associated with the first user; and
Identifying a relationship between the first user and the particular one of the co-users based on the organizational structure.

7. The method of claim 1, further comprising:
providing a first option to send a message to the co-user corresponding to the targeted one of the animated visual representations and a second option to speak with the co-user corresponding to the targeted one of the animated visual representations; and receiving a selection, from the first user, of the second option to speak with the co-user corresponding to the targeted one of the animated visual representations, wherein generating and sending the invitation to join the extended-reality communication session is in response to the selection of the second option.

8. A non-transitory computer-readable medium storing instructions thereon that, when executed by at least one processor, cause the at least one processor to perform operations comprising:

generating, for display on a first extended-reality device corresponding to a first user of a networking system, a graphical user interface element providing a view into an extended-reality room that comprises a digital three-dimensional space having one or more animated visual representations of one or more respective co-users of the networking system, wherein the one or more respective co-users are associated with the first user, wherein one or more of the animated visual representations of the one or more respective co-users were generated without input from a respective co-user, of the one or more respective co-users, for viewing through the interface by the first user;

receiving, from the first user, input targeting one of the animated visual representations of a co-user, corresponding to the targeted one of the animated visual representations, in the digital three-dimensional space of the extended-reality room; and generating and sending, for display on a second extended-reality device corresponding to the co-user, corresponding to the targeted one of the animated visual representations, an invitation to join an extended reality communication session in response to receiving the input.

9. The non-transitory computer-readable medium of claim 8, wherein generating the graphical user interface element providing the view into the extended-reality room comprises generating an extended-reality lobby window graphical user interface element.

10. The non-transitory computer-readable medium of claim 8, wherein each of the one or more of the animated visual representations of the one or more respective co-users of the networking system comprises an avatar that traverses the digital three-dimensional space.

11. The non-transitory computer-readable medium of claim 10, wherein the operations further comprise:

determining a strength of connection between the first user and a particular one of the co-users; and causing an avatar of the particular one of the co-users to traverse the digital three-dimensional space at a frequency based on the strength of connection between the first user and the particular one of the co-users.

12. The non-transitory computer-readable medium of claim 11, wherein the operations further comprise:

generating a task profile associated with the first user based on one or more digital activities executed by the first user;

identifying a similarity between the task profile of the first user and one or more task profiles associated with the particular one of the co-users, wherein determining the strength of connection between the first user and the particular one of the co-users is based on the similarity between the task profile of the first user and the one or more task profiles associated with the particular one of the co-users.

13. The non-transitory computer-readable medium of claim 12, wherein the operations further comprise:

determining an availability status of the particular one of the co-users; and causing the avatar of the particular one of the co-users to traverse the digital three-dimensional space at the frequency further based on the availability status of the particular one of the co-users.

14. The non-transitory computer-readable medium of claim 8, wherein the operations further comprise:

receiving, from the second extended-reality device corresponding to the co-user corresponding to the targeted one of the animated visual representations, an acceptance of the invitation to join the extended-reality communication session; and in response to receiving the acceptance, conduct the extended-reality communication between the first extended-reality device and the second extended-reality device by generating a virtual room comprising an avatar of the first user and an avatar of the co-user corresponding to the targeted one of the animated visual representations.

15. A system comprising:

at least one processor; and at least one non-transitory computer-readable medium comprising instructions that, when executed by the at least one processor, cause the system to:

generate, for display on a first extended-reality device corresponding to a first user of a networking system, a graphical user interface element providing a view into an extended-reality room that comprises a digital three-dimensional space having one or more animated visual representations of one or more respective co-users of the networking system, wherein the one or more respective co-users are associated with the first user, and wherein one or more of the animated visual representations of the one or more respective co-users were generated without input from a respective co-user, of the one or more respective co-users, for viewing through the interface by the first user;

receive, from the first user, input targeting one of the animated visual representations of a co-user, corresponding to the targeted one of the animated visual representations, in the digital three-dimensional space of the extended-reality room; and generate and send, for display on a second extended-reality device corresponding to the co-user, corresponding to the targeted one of the animated visual representations, an invitation to join an extended reality communication session in response to receiving the input.

16. The system of claim 15, further comprising instructions that, when executed by the at least one processor, cause the system to:

provide a first option to send a message to the co-user corresponding to the targeted one of the animated visual representations and a second option to speak with the co-user corresponding to the targeted one of the animated visual representations; and receive a selection, from the first user, of the second option to speak with the co-user corresponding to the targeted one of the animated visual representations, wherein the instructions, when executed by the at least one processor, cause the system to generate and send the invitation to join the extended-reality communication session in response to the selection of the second option.

17. The system of claim 16, wherein the instructions, when executed by the at least one processor, cause the system to send the invitation to join the extended-reality communication session by providing, for display via the second extended-reality device, an animated visual representation of the first user to communicate the invitation.

18. The system of claim 16, further comprising instructions that, when executed by the at least one processor, cause the system to:
  receive, from the second extended-reality device corresponding to the co-user corresponding to the targeted one of the animated visual representations, an acceptance of the invitation to join the extended-reality communication session; and
  in response to receiving the acceptance, conduct the extended-reality communication session between the first extended-reality device and the second extended-reality device by:
  providing the animated visual representation, of the co-user corresponding to the targeted one of the animated visual representations, for display within the graphical user interface element providing the view into the extended-reality room displayed on the first extended-reality device to communicate voice input received from the second extended-reality device corresponding to the co-user corresponding to the targeted one of the animated visual representations; and
  providing an animated visual representation of the first user for display within an additional graphical user interface element providing a view into an extended-reality room displayed on the second extended-reality device to communicate additional voice input received from the first extended-reality device corresponding to the first user.

19. The system of claim 16, wherein the instructions, when executed by the at least one processor, cause the system to generate the graphical user interface element providing the view into the extended-reality room by generating an extended-reality lobby window graphical user interface element.

20. The system of claim 16, wherein each of the one or more of the animated visual representations of the one or more respective co-users of the networking system comprises an avatar traversing the digital three-dimensional space at a frequency.

* * * * *